United States Patent
Kenney et al.

(10) Patent No.: US 11,554,327 B1
(45) Date of Patent: Jan. 17, 2023

(54) TOY FINGER BOARD WITH REMOVABLY ATTACHABLE FINGER SHOES AND METHOD OF MANUFACTURING THE SAME

(71) Applicant: Mattel, Inc., El Segundo, CA (US)

(72) Inventors: Tyler Kenney, Sherman Oaks, CA (US); Timothy Rettberg, Rancho Palos Verdes, CA (US); Neal Thomas Smith, Laguna Hills, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 17/582,558

(22) Filed: Jan. 24, 2022

(51) Int. Cl.
| | |
|---|---|
| *A63H 11/10* | (2006.01) |
| *A63H 17/24* | (2006.01) |
| *A63H 3/14* | (2006.01) |
| *A63H 7/00* | (2006.01) |
| *B29C 65/06* | (2006.01) |
| *B29L 31/52* | (2006.01) |

(52) U.S. Cl.
CPC .............. *A63H 11/10* (2013.01); *A63H 3/14* (2013.01); *A63H 7/00* (2013.01); *A63H 17/24* (2013.01); *B29C 65/0672* (2013.01); *B29L 2031/529* (2013.01)

(58) Field of Classification Search
CPC . A63H 11/10; A63H 3/14; A63H 3/50; A63H 13/045; A63H 7/00; A63H 17/24; B29L 2031/529
See application file for complete search history.

(56) References Cited

U.S. PATENT DOCUMENTS

| | | |
|---|---|---|
| 3,844,574 A | 10/1974 | Kosono |
| 3,901,521 A | 8/1975 | Famolare, Jr. |
| 4,071,256 A | 1/1978 | Kimmell |
| 4,120,510 A | 10/1978 | Hillard |
| 4,123,080 A | 10/1978 | Agajanian |
| 4,176,850 A | 12/1979 | Johnson |

(Continued)

FOREIGN PATENT DOCUMENTS

| | | | |
|---|---|---|---|
| EP | 1174165 A2 * | 1/2002 | ........... A63C 9/0841 |
| EP | 1230963 A2 | 8/2002 | |
| JP | 2000279652 A | 10/2000 | |

OTHER PUBLICATIONS

Translation EP1174165A2 (Year: 2002).*

(Continued)

*Primary Examiner* — Alvin A Hunter
*Assistant Examiner* — Alyssa M Hylinski
(74) *Attorney, Agent, or Firm* — Edell, Shapiro & Finnan, LLC

(57) ABSTRACT

A toy finger board kit includes a board and at least one shoe. Each shoe includes a finger hole in an upper of the shoe and at least one bracket on a sole of shoe. The at least one bracket is configured to removably attach the at least one shoe to the board. In some instances, the board is formed by inserting a flange portion of a toy finger skateboard truck into a flange receiver of a toy finger skateboard deck. Then, the toy finger skateboard truck is moved such that a column portion of the toy finger skateboard truck is received by a through hole of the toy finger skateboard deck. Finally, a top end of the column portion of the toy finger skateboard truck is affixed to the toy finger skateboard truck to the toy finger skateboard deck.

11 Claims, 13 Drawing Sheets

(56) References Cited

U.S. PATENT DOCUMENTS

| | | | |
|---|---|---|---|
| 4,230,330 A | 10/1980 | Muhammad | |
| 4,836,819 A | 6/1989 | Oishi | |
| 4,911,456 A | 3/1990 | Sarazen | |
| 4,938,698 A * | 7/1990 | Chantry | A63B 69/18 446/327 |
| 5,052,702 A | 10/1991 | Chan | |
| 5,769,438 A | 6/1998 | Svetlov | |
| 5,906,388 A * | 5/1999 | Neiley | A63C 10/10 280/14.22 |
| 6,074,271 A | 6/2000 | Derrah | |
| 6,146,237 A | 11/2000 | Rehkemper | |
| D436,856 S | 1/2001 | Asher | |
| 6,179,685 B1 * | 1/2001 | Toft | A63H 3/52 446/268 |
| 6,315,630 B1 | 11/2001 | Yamasaki | |
| 6,350,174 B1 * | 2/2002 | Halford | A63H 18/028 446/478 |
| 6,371,828 B1 * | 4/2002 | Ngan | A63H 17/16 446/411 |
| 6,431,943 B1 | 8/2002 | Rehkemper | |
| 6,533,638 B1 * | 3/2003 | Nelson | A63H 33/30 446/139 |
| 6,540,577 B1 * | 4/2003 | Nelson | A63H 33/26 446/139 |
| 6,547,262 B1 | 4/2003 | Yamada | |
| 6,793,552 B2 | 9/2004 | Derrah | |
| 6,813,847 B2 * | 11/2004 | Workman | A43B 5/18 36/15 |
| 6,893,318 B2 * | 5/2005 | Søviknes | A63H 3/46 446/379 |
| 7,297,042 B2 | 11/2007 | Whitehead | |
| 7,931,519 B2 | 4/2011 | Fox | |
| 7,984,917 B2 | 7/2011 | Lake | |
| 8,091,901 B2 * | 1/2012 | Haskell | A43C 15/00 280/11.3 |
| 8,328,206 B2 | 12/2012 | Williams, Jr. | |
| 8,425,337 B2 | 4/2013 | Thompson | |
| 8,465,339 B2 | 6/2013 | Sheltman | |
| 8,591,283 B2 | 11/2013 | Hahn | |
| 8,870,199 B2 | 10/2014 | Fehn | |
| 8,870,212 B2 | 10/2014 | Noyes | |
| D720,825 S | 1/2015 | Norman | |
| 9,050,540 B1 * | 6/2015 | Norman | A63H 17/26 |
| 9,162,153 B1 | 10/2015 | Mimlitch, III | |
| 9,289,694 B2 | 3/2016 | Norman | |
| 10,104,936 B2 * | 10/2018 | Mulholland | A43B 5/1641 |
| 10,118,105 B2 | 11/2018 | Norman | |
| 2001/0038187 A1 | 11/2001 | Reyes | |
| 2002/0140195 A1 * | 10/2002 | Lumb | A63C 17/26 280/87.041 |
| 2002/0182975 A1 * | 12/2002 | Schaffer | G09B 19/0038 446/376 |
| 2003/0075890 A1 | 4/2003 | Jacobs | |
| 2003/0094788 A1 | 5/2003 | Jacobs | |
| 2003/0160411 A1 * | 8/2003 | Turner | A63C 17/18 280/87.042 |
| 2003/0211789 A1 * | 11/2003 | Taylor | B63B 32/47 441/74 |
| 2004/0061300 A1 | 4/2004 | Grossman | |
| 2004/0104551 A1 | 6/2004 | Jacobs | |
| 2006/0160458 A1 * | 7/2006 | Peach | A63H 3/02 446/72 |
| 2008/0197595 A1 * | 8/2008 | Fox | A63H 33/30 280/87.042 |
| 2008/0242192 A1 | 10/2008 | Derrah | |
| 2009/0298379 A1 * | 12/2009 | Henson | A63H 3/14 446/26 |
| 2010/0216368 A1 | 8/2010 | Del Principe | |
| 2010/0237599 A1 | 9/2010 | Bianchi | |
| 2011/0000609 A1 | 1/2011 | Carrillo | |
| 2011/0003532 A1 | 1/2011 | McCafferty | |
| 2013/0084770 A1 * | 4/2013 | Hahn | A63H 3/46 446/330 |
| 2015/0238845 A1 | 8/2015 | Clayton | |
| 2016/0016092 A1 * | 1/2016 | Oi | F16B 2/22 24/561 |
| 2016/0296825 A1 | 10/2016 | Wolniansky | |
| 2017/0056756 A1 | 3/2017 | Pikulski | |
| 2019/0015730 A1 | 1/2019 | Pikulski | |

OTHER PUBLICATIONS

Finger Boarding Tricks with Mini Sneakers Shoes, Sep. 9, 2021, <https://www.youtube.com/watch?v=bMYfC0HRnjY> (Year: 2021).*
Finger Boarding Ticks with Mini Sneakers Shoes, Sep. 9, 2021, <https://www.youtube.com/watch?v=bMYfC0HRnjY> (Year: 2021).*
Amazon product X Games Snow Finger Snowboard Constant Boots Forum, Thirtytwo, Burton, Bullet, Dominant, Youngblood, Leopard, Eighties, Manual Performance (P3719), <https://www.amazon.com/Snowboard-Constant-Thirtytwo-Youngblood-Performance/dp/B077TZD6GV/ref=mp_s_a_1_4?keywords=finger+snowboard&qid=1638909202&sr=8-4>, accessed Dec. 7, 2021.

* cited by examiner

TOY FINGER BOARD WITH REMOVABLY ATTACHABLE FINGER SHOES AND METHOD OF MANUFACTURING THE SAME

FIELD OF THE INVENTION

The present invention relates generally to toy finger boards, and more specifically to toy finger boards associated with finger shoes, which are configured to be removably attached to the finger boards. Furthermore, the present invention also relates to a method of manufacturing a toy finger skateboard.

BACKGROUND

In the toy industry, toy finger boards have become an extremely popular and well-known play option for both children and adults. Directed largely to children and collectors, these toy finger boards typically resemble and have features similar to the life-sized boards used for the corresponding sport. Some of the most popular toy finger boards are toy finger skateboards, however, other toy finger boards such as toy finger snowboards, surfboards, wakeboards, and wakeskate boards have been made. However, while the appearances and physical size, as well as other design properties, have been stressed and improved upon to provide greater cohesiveness with the corresponding life-size boards, the functionality and manufacture of toy finger boards has remained relatively unchanged and, thus, is in need of constant enhancement and improvement.

The functionality of existing toy finger skateboards is limited because the existing toy finger skateboards are not configured to be removably attachable to the user's finger tips. In this regard, a user playing with an existing toy finger skateboard may only be limited to performing tricks on a flat surface such as a floor, desk, or table. Tricks performed with toy finger skateboards on flat surfaces are often referred to as flat ground tricks and are generally difficult to perform using toy finger skateboards, especially for children. Further, it is even more difficult to perform aerial tricks using existing toy finger skateboards, i.e., without the user grabbing the toy finger skateboard with the user's fingertips, which would obviate the preferred manner of play in which the user uses only two fingers to imaginatively replicate the legs of a life-size skateboarder. Therefore, existing toy finger skateboards limit the play modes with which the toy finger skateboard can be used. Accordingly, it is desirable to provide a toy finger skateboard with additional enhancements and play modes.

Additionally, the existing processes by which toy finger skateboards are manufactured are in need of constant enhancement and improvement. Toy finger skateboards are typically manufactured such that the constituent elements of the toy finger skateboards largely correspond to the constituent elements of life-size skateboards. For example, existing toy finger skateboards often use miniature nuts and bolts to connect miniature trucks to a miniature deck of the toy finger skateboard in a similar way that nuts and bolts are used to connect the trucks to the deck of a life-sized skateboard. The many components used to manufacture and assemble existing toy finger skateboards frequently complicates the manufacturing process because several different machines and processes are often required to manufacture and assemble the many individual components.

Further, in instances in which existing toy finger skateboards are packaged and sold in a disassembled manner, packaging is more complicated due to the individual components, and the small components may be cumbersome to assemble for the user with poor eyesight or a user that is not particularly dexterous, which may be the case for many children. These small components may also be easily lost or misplaced. If one or more of the small components are lost or misplaced, the structural integrity of the toy finger skateboard may be compromised or the toy finger skateboard may be rendered inoperative. Accordingly, it is desirable to provide a method of manufacturing a toy finger skateboard that reliably secures the miniature trucks to the miniature deck in a cost effective manner and/or in a manner that avoids the use of small removable structural components that are hard to see, hard to use, and easy to lose.

SUMMARY

According to one exemplary embodiment of the present invention, a method of manufacturing a toy finger skateboard may comprise: inserting a flange portion of a toy finger skateboard truck into a flange receiver of a toy finger skateboard deck; moving the toy finger skateboard truck such that a column portion of the toy finger skateboard truck is received by a through hole of the toy finger skateboard deck; and interacting with a top end of the column portion of the toy finger skateboard truck to affix the toy finger skateboard truck to the toy finger skateboard deck.

In some of these embodiments, the portion of the top end of the column portion may be cylindrical. However, the entire column portion or a portion of the column portion may be any suitable shape. Additionally or alternatively, the top end of the column portion of the toy finger skateboard truck may be welded to a seat portion of the toy finger skateboard deck. For example, the welding of the top end of the column portion of the toy finger skateboard truck to the seat portion of the toy finger skateboard deck may be accomplished by spin welding. Additionally or alternatively, the welding of the top end of the column portion of the toy finger skateboard truck to the seat portion of the toy finger skateboard deck may be accomplished by deforming the top end of the column portion to create a seat flange within the seat portion.

In some embodiments, the seat portion of the toy finger skateboard deck may be below a top surface of the toy finger skateboard deck. Additionally or alternatively, a grip layer may be affixed to the top surface of the deck. Thus, in some instances, the grip layer may cover the seat portion of the deck.

According to another exemplary embodiment, a toy finger board kit may include a board and at least one shoe. Each shoe comprises a finger hole in an upper of the at least one shoe and at least one bracket on a sole of the shoe. The bracket is configured to removably attach the at least one shoe to the board.

In some of these embodiments, a shoe may have a length that is longer than a width of the board. Additionally or alternatively, there may be a first bracket attached to a front end of the sole and a second bracket attached to a back end of the sole. For example, the first bracket may be configured to wrap around a first side edge of the board, and the second bracket may be configured to wrap around a second side edge of the board, wherein the first side edge and the second side edge are on opposing sides of the board. Additionally or alternatively, the first bracket may be configured to contact a first side edge of the board, and the second bracket may be configured to contact a second side edge of the board, wherein the first side edge and the second side edge are on opposing sides of the board.

In some embodiments where at least one shoe includes two brackets, the at least one shoe may comprise a deformable material and be configured to attach to the board by placing the first bracket on the first side edge of the board and deforming the at least one shoe such that the second bracket wraps around the second side edge of the board. The deformable material of the shoe may be an elastic material that returns to its original shape after deformation, and the deformable material may be a resilient deformable material. Alternatively, the at least one shoe may comprise a rigid material. Regardless of the material of the shoe, the shoe may be configured to slide onto the board from a front end or a back end of the board.

Still further, in some embodiments, there may be an insert configured to be inserted into the sole of the at least one shoe between the first bracket and the second bracket. Additionally or alternatively, the toy finger board may be a toy finger skateboard.

According to still another exemplary embodiment, a shoe for a toy finger board may comprise a finger hole in an upper of the at least one shoe and a bracket assembly on a sole of the at least one shoe. The bracket assembly is configured to removably attach the shoe to the toy finger board. In some of these embodiments, the shoe may further comprise an insert that is configured to be inserted into the bracket assembly such that the sole of the shoe has a continuous bottom surface. Additionally or alternatively, the bracket assembly may include any of the features, and realize any of the advantages of, any embodiments discussed herein.

DETAILED DESCRIPTION

Figure 1:
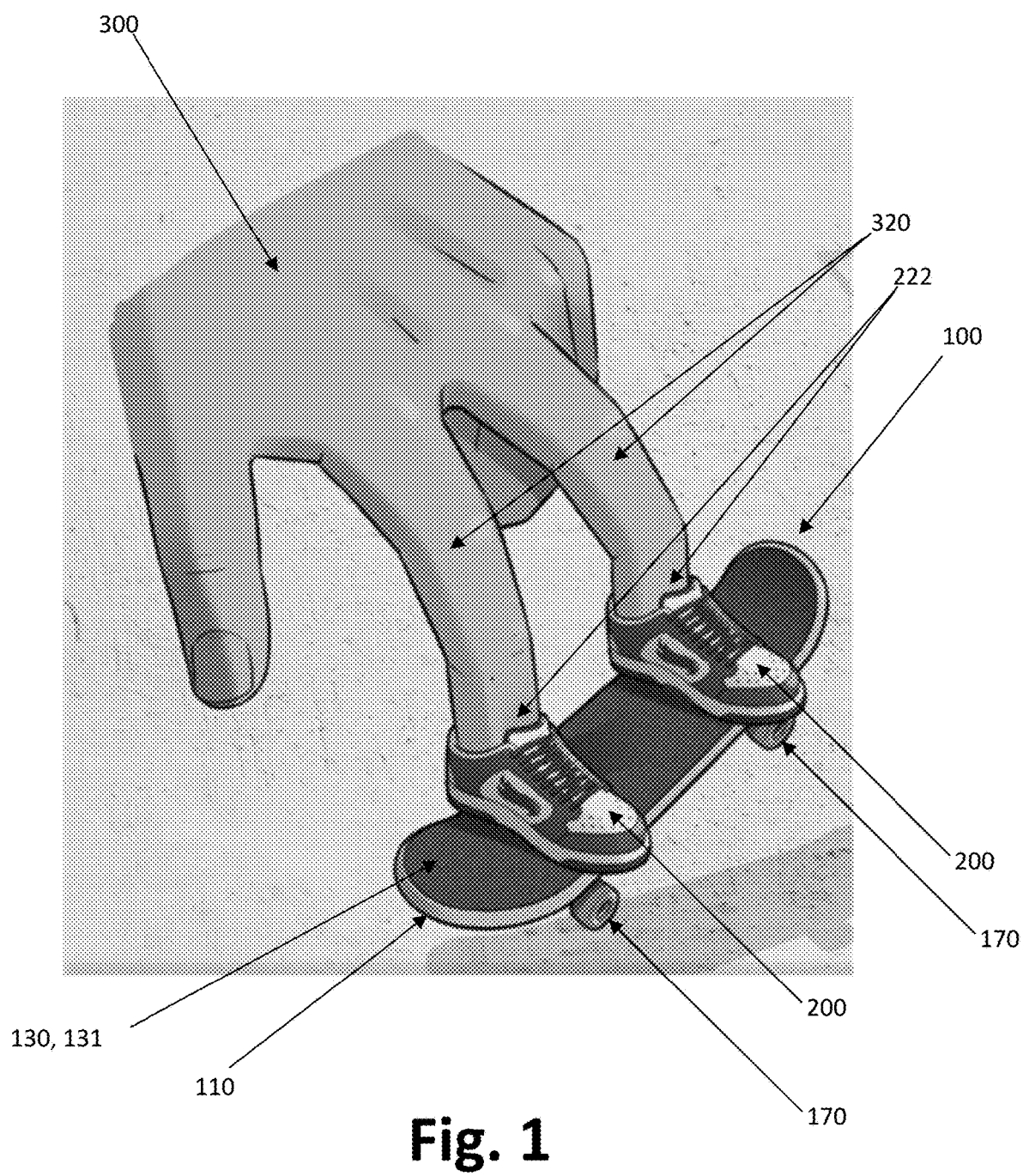
FIG. 1 shows an exemplary toy finger skateboard that is being controlled by a user's finger-tips inserted into toy finger shoes in accordance with an embodiment of the present application.

Referring generally to FIGS. 1-8, a toy finger board 100 is configured to be controlled by fingers 320 of a user's hand 300. According to an exemplary embodiment, the toy finger skateboard assembly 100 may be used with or without toy finger shoes 200. Further, the toy finger shoes 200 may or may not be attached to the toy finger skateboard assembly 100. In one embodiment, finger holes 222 of toy finger shoes 200 are configured to accept the finger-tips (not shown) of the user's fingers 320 such that the user wears each finger shoe 200 on a distal end of the user's finger. In the embodiment shown in FIG. 1, toy finger board 100 is a toy finger skateboard assembly. However, in other embodiments, the toy finger board 100 may be a toy finger snowboard, surfboard, wakeboard, or wakeskate board, and may have a corresponding structure, appearance, and/or ornamentation to resemble the same. Similarly, in the embodiment shown in FIG. 1, toy finger shoes 200 are skateboard shoes. However, in other embodiments, the toy finger shoes 200 may be any type of shoes or boots such as, e.g., water shoes, wakeskating shoes, tennis shoes, basketball shoes, sandals, dress shoes, heels, cowboy boots, or snowboard boots that may or may not have corresponding bindings (which may be removably attachable thereto). As such, the toy finger shoes 200 may have a corresponding structure, appearance, and/or ornamentation to resemble any desirable shoes that may be used with any toy finger board 100.

As illustrated in FIG. 1, the toy finger board 100 is a toy finger skateboard assembly that includes, inter ilia, a toy finger skateboard deck 110 connected to wheels 170 configured to roll on a variety of surfaces such as, e.g., a surface of a desk, table, counter, or floor.

A grip layer 130 may be attached to a top surface 111 (see FIG. 2) of the toy finger skateboard deck 110. A bottom surface 134 (see FIG. 2) of the grip layer 130 may include an adhesive configured to bond the bottom surface of the grip layer 130 to the top surface 111 of the deck HO. Alternatively, an adhesive may be applied to a top surface 111 of the deck 110 to secure the grip layer 130 to the top surface 111 of the deck 110. A top surface 132 of the grip layer 130 may have a gritty or rough surface and may be composed of, e.g., sandpaper, a sandpaper-like material, silicon carbide, aluminum oxide, or the like. The grip layer 130 of the toy finger skateboard assembly 100 may serve the aesthetic purpose of resembling a grip tape of a life-size skateboard. Further, the grip layer 130 may be functional and provide resistance and friction between the deck 110 and the shoes 200, particularly when the inserts 260 are within the soles 240 of the shoes 200, which are further described below with reference to FIGS. 6A and 6B. In an alternative embodiment, the grip layer 130 is not included in the toy finger skateboard assembly 100; instead, the top surface 111 of the toy finger skateboard deck 110, in and of itself, have a gritty or rough surface.

As noted above, the toy finger board 100 is not necessarily limited to a toy finger skateboard. Accordingly, instead of a toy finger skateboard deck 110, the toy finger board 100 may be a snowboard, surfboard, wakeboard, or wakeskate board. In this regard, the top surface 132 of the grip layer 130 may not resemble grip tape of a life-size skateboard and may not include a gritty or rough surface. For example, the grip layer 130 may be composed of, e.g., a soft, high-traction, water-resistant foam material. Such foam material may comprise, e.g., ethylene-vinyl acetate (EVA), poly ethylene-vinyl acetate (PEVA), or a polyethylene-vinyl acetate copolymer. In the case of a toy finger surfboard, the grip layer 130 may resemble a life-size surfboard's traction pad, also known as a stomp pad, and may be affixed to a portion of a back end of a top surface 111 of the toy finger surfboard. In the case of a toy finger wakeskate board, the grip layer 130 may be similar in composition and appear as a grip layer of a life-size wakeboard. In the case of a toy finger snowboard or wakeboard, there may not be a grip layer 130 as the user's fingers might be attached to the toy finger snowboard or wakeboard via bindings.

Figure 2:
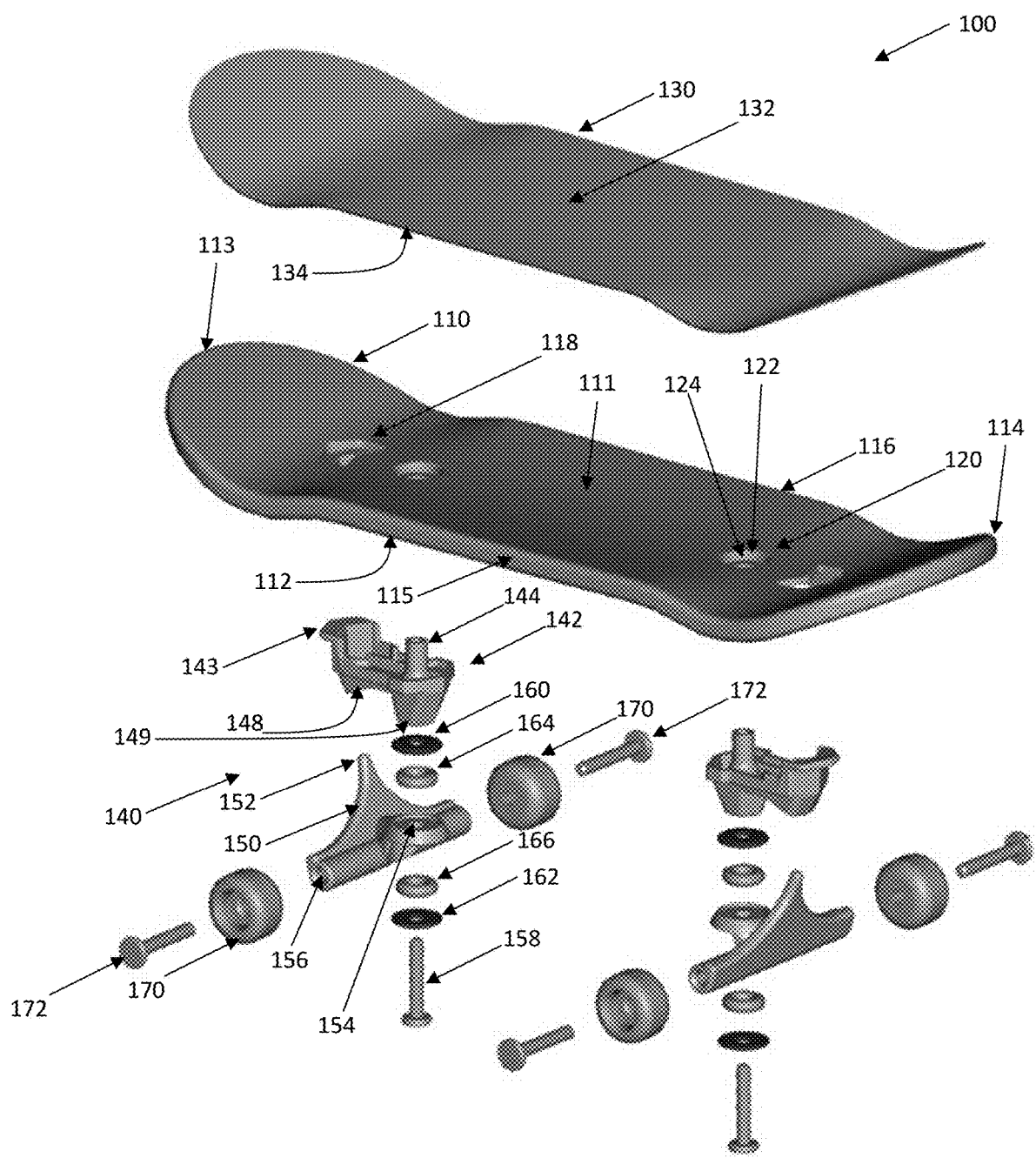
FIG. 2 shows an exploded view of a toy finger skateboard assembly in accordance with aspects of the present application.

Referring now to FIG. 2, an exploded view of the toy finger skateboard assembly 100 is shown. The toy finger skateboard assembly 100 generally includes a deck 110, two truck assemblies 140, and an optional grip layer 130.

The deck 110 may generally include a top surface 111, a bottom surface 112, a first end 113, a second end 114, a first side 115, and a second side 116. The top surface 111 and bottom surface 112; the first end 113 and second end 114; and the first side 115 and second side 116 are generally on respectively opposing sides of the deck 110. That is, the deck 110 may extend from the top surface 111 to the bottom surface 112 (e.g., in a height or y-direction); from the first end 113 to the second end 114 (e.g., in a length or x-direction); and from the first side 115 to the second side 116 (e.g., in a width or z-direction).

The deck 110 may have curves along the length and the width of the board, which may resemble the curves of a life-sized classic skateboard. With respect to the curve along the length of the board, on the distal ends of the first end 113 and the second end 114, there may be "tails" that curve upward from the center of the top surface 111. These tails may be used to "kick" the toy finger skateboard assembly 100 into the air, e.g., to perform an "ollie" or other ground tricks. With respect to the curve along the width of the board, there may a slight concave curve from the first side 115 to the second side 116. This curve along the width of the board may be useful when performing "flip tricks" with the toy finger skateboard assembly 100. For example, a user may perform the aerobatic maneuver of a "kickflip" with the toy finger skateboard assembly by first using the tail to "kick" the toy finger skateboard assembly 100 into the air, and while the board is in the air, using a finger to apply pressure to either the first side 115 or the second side 116 such that the toy finger skateboard assembly 100 performs a spiral while rolling once about its longitudinal axis. The concave curve along the lateral axis is further described below with reference to FIGS. 7-8 in relation to the shape of the inserts 260 and shoes 200.

While the toy finger skateboard assembly 100 shown in FIGS. 1-5 has a shape that resembles the shape of a classic skateboard, which is symmetrical about vertical planes through the longitudinal and lateral centers of the board, the toy finger skateboard assembly 100 is not necessarily limited to such a configuration. The toy finger skateboard assembly 100 may instead resemble, e.g., an "oldschool" skateboard that only has one tail and a curved, pointed nose; a penny skateboard; a slalom longboard skateboard; a technical sliding longboard skateboard; a cruiser skateboard; a carving longboard skateboard; a "freerider" longboard skateboard; a cruising longboard skateboard; a long di stance longboard skateboard; a "speedboard" skateboard; a boardwalking longboard skateboard; a surf style longboard skateboard; or any style skateboard.

The deck 110 may further include at least one flange receiver 118 and at least one through hole 120. The through hole 120 may include a seat 122 and a throat 124. A flange receiver 118 may be associated with a through hole 120 (i.e., positioned in relatively close proximity) and may be configured to accept a truck assembly 140, as further described below. In the embodiment shown in FIG. 2, there is a first flange receiver 118 associated with a first through hole 120 which are collectively configured to accept a first truck assembly 140; and there is a second flange receiver 118 associated with a second through hole 120 which are collectively configured to accept a second truck assembly 140. However, in other embodiments, there may be any number of flange receivers 118 and/or through holes 120. For example, a finger board might include only a single truck assembly (alone or in combination with features suitable to attach a conventional truck to the deck 110 in a conventional manner).

Each truck assembly 140 generally includes a base body 142 and a hanger 150, washers 160 and 162, bushings 164 and 166, and a kingpin 158. The hanger 150 includes a pivot point 152, a through hole 154, and two wheel pin cavities 156. The pivot point 152 is configured to be accepted by a pivot point receiver 148 of the base body 142. As shown in FIG. 2, an upper bushing 164 may be placed on the upper side of the through hole 154 is and a lower bushing 166 may be placed on the lower side of the through hole 154. The upper bushing 164 and lower bushing 166 may be deformable annular (e.g., donut-shaped) rings made out of materials, rubber, that are configured to deform when the pivot point 152 pivots within the pivot point receiver 148 such as when an assembled toy finger skateboard assembly 100 turns. An upper washer 160 may be placed on the upper side of the upper bushing 164, and a lower washer 162 may be placed on the lower side of the lower bushing 166. The upper washer 160 and lower washer 162 may be, e.g., flat disk-shaped components that each have a through hole.

The hanger 150 is configured to be attached the base body 142. In particular, the kingpin 158 may be configured to be placed through the through hole of the bottom washer 162, the center of the annular bottom bushing 166, the through hole 154 of the hanger 150, the center of the annular upper bushing 164, the through hole of the upper washer 160, and finally into the kingpin receiver 149 of the base body 142. In this regard, the kingpin 158 is configured to secure the hanger 150 to the base body 142 of the truck assembly 140.

Each truck assembly 140 is further configured to be connected to two wheels 170 via wheel pins 172, which are configured to be inserted through the centers of the wheels 170 and into a respective wheel pin cavity 156. Each wheel 170 may be configured to spin about the respective wheel pin 172 and there may be bearings (not shown) between the wheels and the wheel pins. While the truck assembly 140 shown in FIG. 2 includes wheel pin cavities 156, which are configured to accept wheel pins 172, an alternate embodiment may not include wheel pin cavities 156 and/or wheel pins 172; instead laterally extending axles (not shown) may be unitarily formed with the hangers 150. In this alternate embodiment, the axles may be configured to be placed through the centers of the wheels, the wheels may be secured to the axles via axle nuts, and the wheels may be configured to spin about the axles.

The base body 142 of the truck assembly 140 may be configured to attach to a bottom surface 112 of the deck 110. A method of attaching the base body 142 to the deck 110 is further described below with reference to FIG. 8. In addition to the pivot point receiver 148 and the kingpin receiver 149, which are respectively configured to accept the pivot point 152 of the hanger 150 and the kingpin 158, the base body 142 further includes a flange 143 and a column 144. The flange 143 and the column 144 of the base body 142 are respectively configured to be inserted into the flange receiver 118 of the deck 110 and the throat 124 of the through hole 120 of the deck 110.

As mentioned, the grip layer 130 includes a top surface 132 and a bottom surface 134, which is configured to attach to a top surface 111 of the deck 110. Thus, the grip layer 130 may be configured to cover the flange receiver 118 and the through hole 120 in order to make for a substantially smooth and aesthetically pleasing surface top surface of the assembled toy finger skateboard assembly 100.

FIGS. 3A-3E show a partially assembled toy finger skateboard assembly 100. In particular, FIGS. 3A-3E show a toy finger skateboard assembly 100 that has assembled truck assemblies 140, which have been placed within the deck 110, but have not yet been secured to the deck 110. Further detail of an exemplary process by which a truck assembly 140 may be inserted into and welded to the deck 110 is described below with reference to 5A-5F.

Figure 3B:
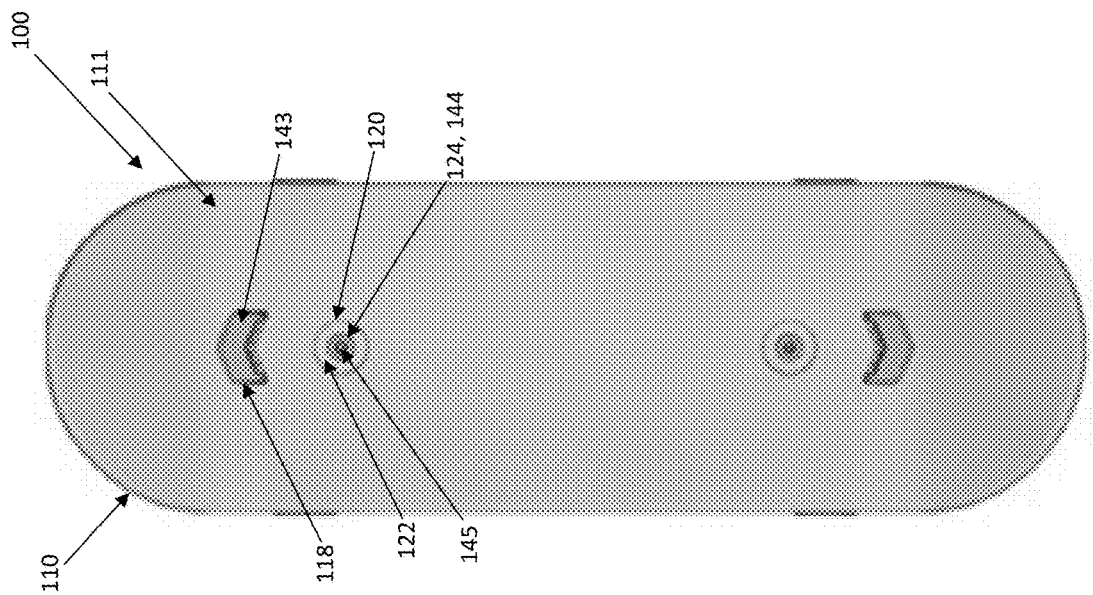
FIGS. 3A, 3B, 3C, 3D, and 3E respectively show bottom, top, front, side, and isometric perspective views of a toy finger skateboard in accordance with aspects of the present application.
Figure 3A:
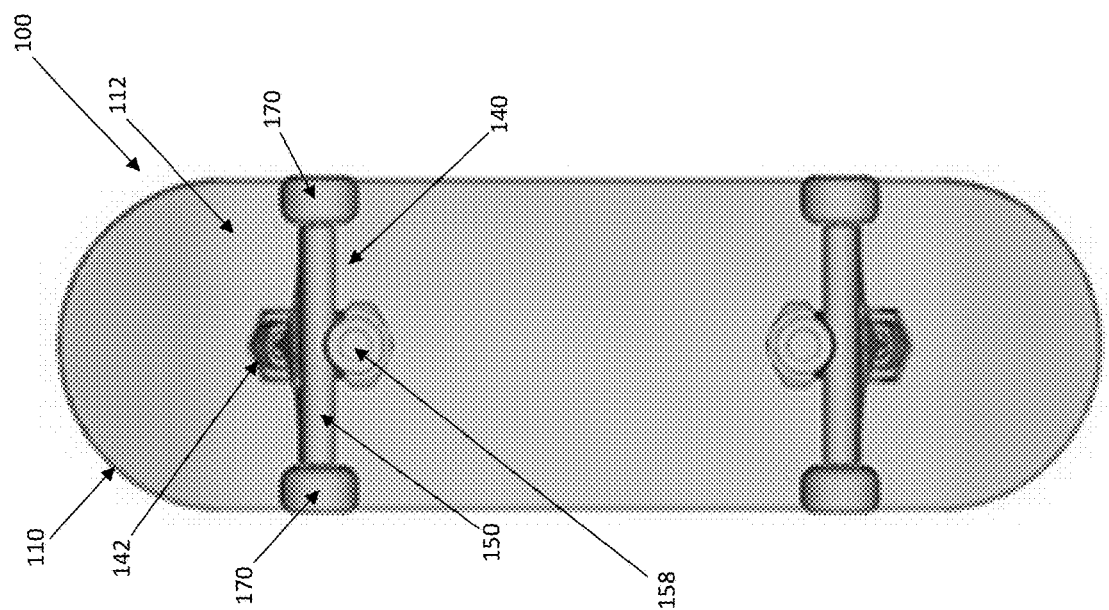

FIG. 3A shows a bottom view including the bottom surface 112 of the deck 110 to which the truck assemblies 140 are attached. The truck assemblies 140 include; among other components, the hanger 150, the base body 142, and the kingpin 158. FIG. 3B shows a top view of the toy finger skateboard assembly 100 prior to or without attachment of the grip layer 130. The top view shows the top surface 111 of the deck 110, which includes a flange receiver 118 and a through hole 120. As shown, the through hole 120 includes a seat 122 and a throat 124 that can receive the column 144 of the base body 142 (of a truck assembly 140). Specifically, the flange 143 can be inserted into the flange receiver 118 and the column 144 can be inserted through the throat 124 of the through hole 120 of the deck 110.

Figure 3C:
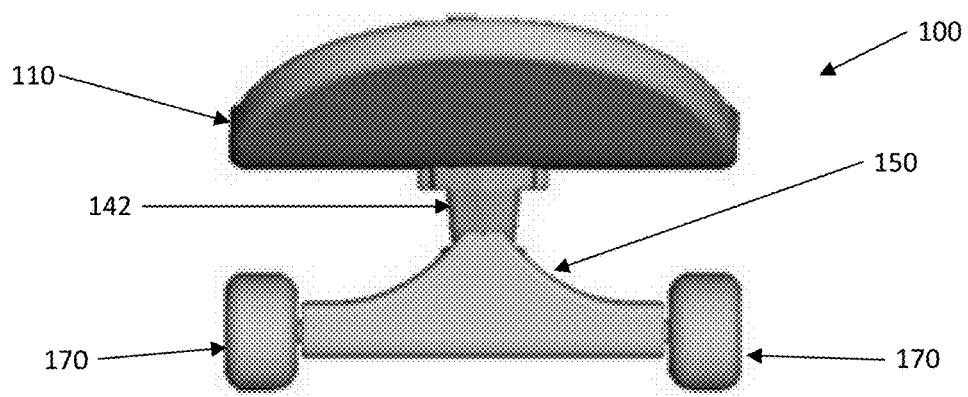
Figure 3D:
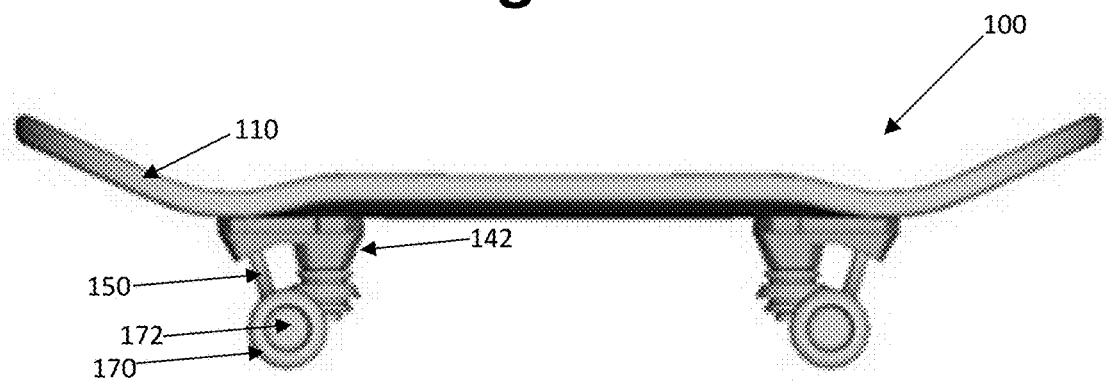
Figure 3E:
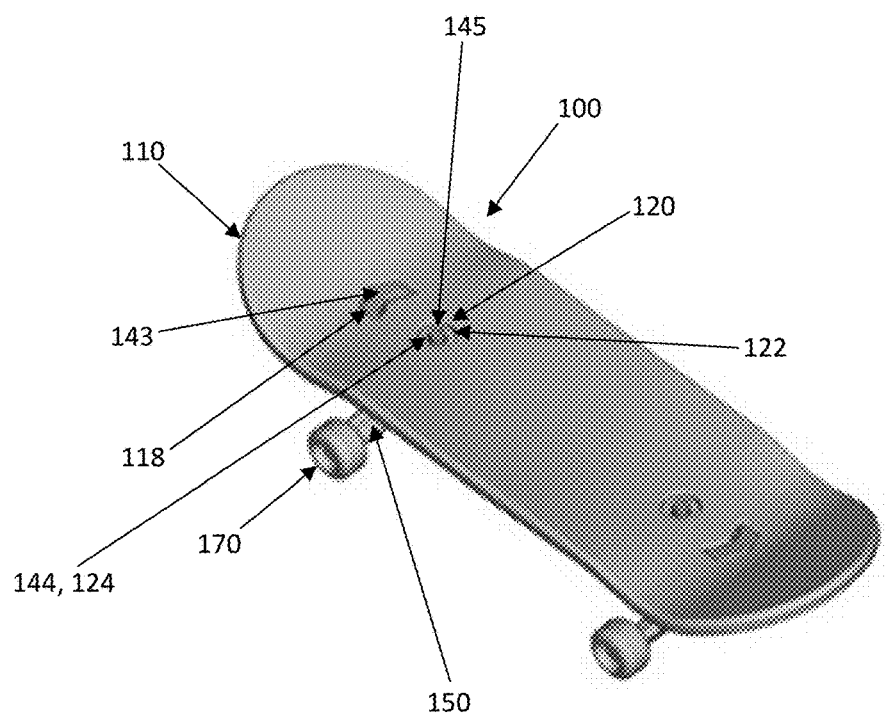

FIG. 3C shows a front view of the toy finger skateboard assembly 100 including the deck 110, the base body 142, the hanger 150, and two wheels 170. FIG. 3D shows a side view of the finger skateboard assembly 100 including the deck 110 two truck assemblies 140, each of which include a base body 142 and a hanger 150, which are attached to wheels 170 via wheel pins 172. FIG. 3E shows an isometric view of the toy finger skateboard assembly 100 and shows the components noted-above in FIG. 3B and further shows wheels 170 and hangers 150.

Figure 4A:
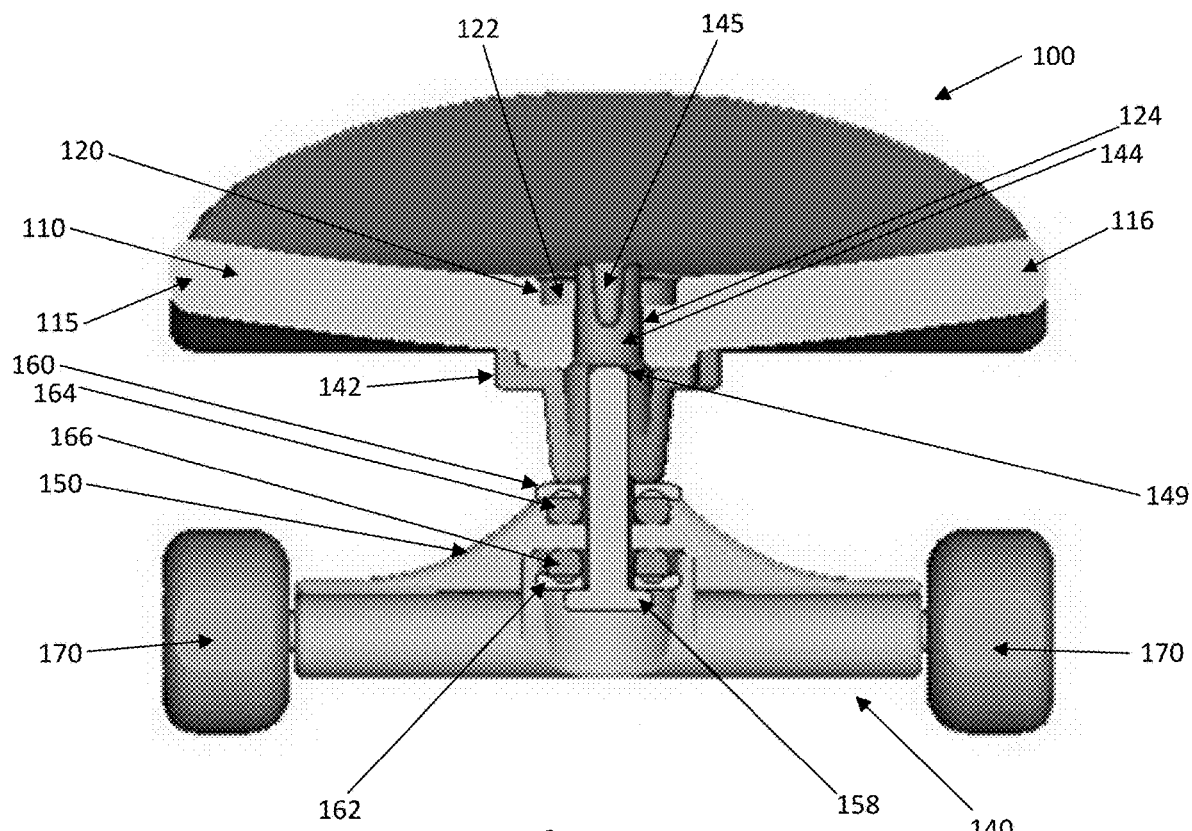
FIG. 4A, shows a front perspective, cross-sectional view with a cross section through the centers of a kingpin and column of a base body of a truck assembly, in accordance with aspects of the present application.
Figure 4B:
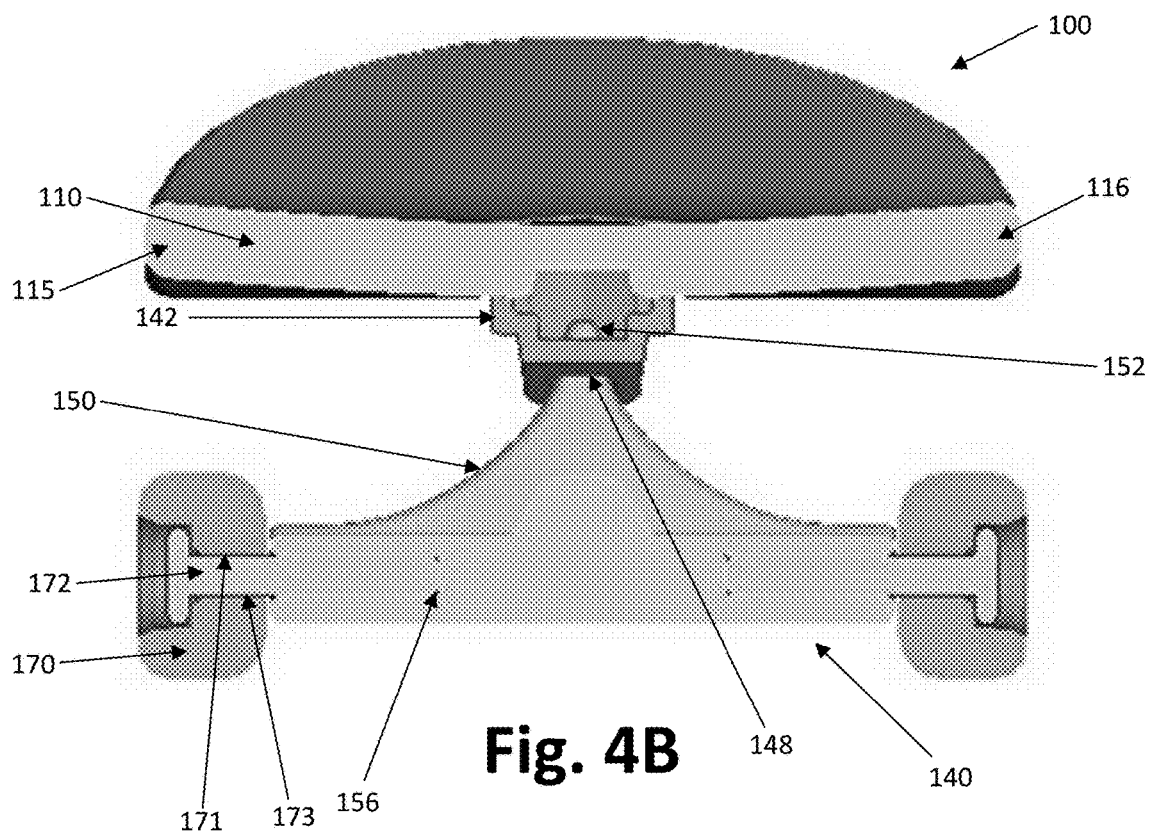
FIG. 4B shows a front perspective, cross-sectional view with a cross section through the centers of two wheels and two wheel pins, in accordance with aspects of the present application.
Figure 4C:
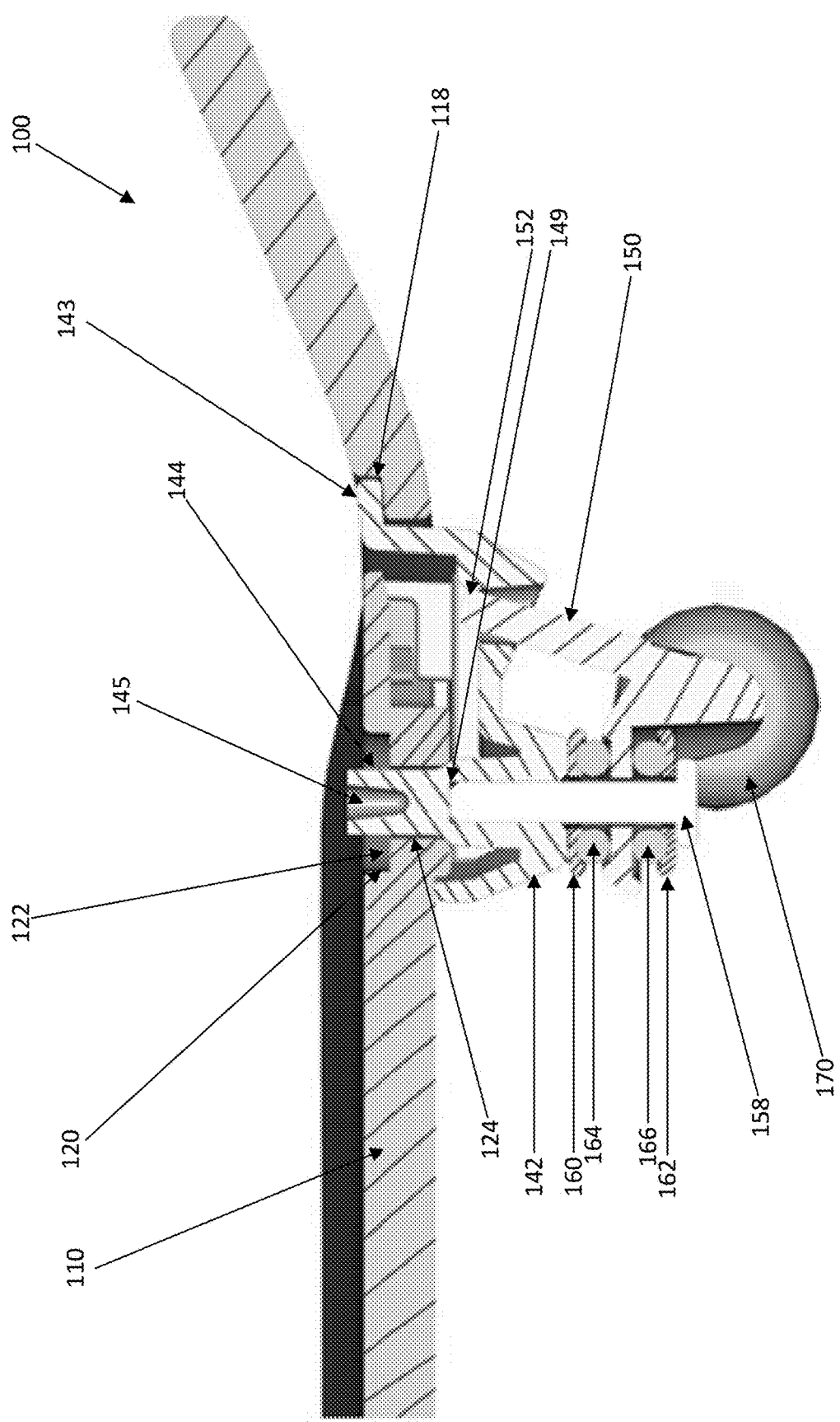
FIG. 4C shows a side perspective, cross-sectional view with a cross section through the centers of the kingpin and the column of the base body of the truck assembly, in accordance with aspects of the present application.

FIGS. 4A-4C show various cross-sectional views of the partially assembled toy finger skateboard assembly 100 shown in FIGS. 3A-3E. First, FIG. 4A shows a front view of the toy finger skateboard assembly 100 with a cross section through the centers of the kingpin 158 and the column 144 of the base body 142. As illustrated, the through hole 120 of the deck 110 includes a seat 122 and a throat 124 within which the column 144 of the base body 142 is disposed. In the embodiment shown, the throat 124 and seat 122 are hollow cylindrical sections of the through hole 120, with the seat 122 having a diameter larger than the throat 124. However, the shapes of the through hole 120, seat 122, and/or throat 124 are not necessarily cylindrical and may have any suitable shape(s) or dimension(s). Similarly, the column 144 may be cylindrical or may have any suitable shape(s).

Moreover, in the depicted embodiment, the column 144 of the base body 142 includes a cavity 145 that has a cone-shaped cavity having a curved bottom. However, other embodiments can include a cavity of any shape or need not include a cavity. In any case, a height of the column 144 may be greater than a height of the through hole 120. In one embodiment, the column 144 is configured to be deformed from an original state S1, which is the state shown in FIG. 4A, to a deformed state S2, in which state the base body 142 of the truck assembly 140 is secured to the deck 110. As noted above, when assembled, the truck assembly 140 includes a kingpin 158 that is placed through the through hole of the bottom washer 162, the center of the donut-shaped bottom bushing 166, the through hole 154 of the hanger 150, the center of the donut-shaped upper bushing 164, the through hole of the upper washer 160, and finally into the kingpin receiver 149 of the base body 142. In the depicted embodiment, none a these components extend into the through hole 120. However, the depicted embodiment is just an example and the truck assembly 140 and/or the through hole 120 is/are not limited to this particular configuration of components, and may be assembled with additional and/or alternative components and/or methods now known or later developed, for example, so that at least some of the aforementioned components are secured with through hole 120 during installation of the truck assembly 140 onto deck 110.

Second, FIG. 4B shows a front view of the toy finger skateboard assembly 100 with a cross section through the centers of the wheels 170 and the wheel pins 172. In the illustrated embodiment, the wheels 170 are attached to the hanger 150 via wheel pins 172, which are inserted into and attached to wheel pin cavities 156. In one embodiment, the inner surfaces 171 of the wheels 170 and outer surfaces 173 of the wheel pins 172 adjacent to the wheels 170 have smooth surfaces to minimize friction therebetween. As such, bearings (not shown) are not necessary and may save cost by minimizing the number of components and simplifying the manufacturing process. However, one or more bearings may be included between each wheel and the wheel pin or the axle to reduce friction and enable the wheel(s) to roll faster. The pivot point 152 of the hanger 150 may be placed within the pivot point receiver 148 of the base body 142.

When the toy finger skateboard assembly 100 is completely assembled and performs a turning motion, the first side 115 of the deck 110 may be moved closer to the wheel beneath the first side 115 and the second side 116 may be moved further from the wheel beneath the second side 116. That is, the deck 110 may tilt towards side 115. Further, the substantially rigid kingpin 158 may not deform, but instead the pivot point 152 of the hanger 150 may pivot within the pivot point receiver 148 of the base body 142; and the deformable upper bushing 164 and the deformable lower bushing 166 may compress their shape on the side of the hanger 150 closer to the wheel beneath the first side 115 of the deck 110.

When turning the opposite direction, the second side 116 of the deck 110 may be moved closer to the wheel beneath the second side 116 and the first side 115 may be moved further from the wheel beneath the first side 115. That is, the deck 110 may tilt towards side 116. Similarly, while the substantially rigid kingpin 158 does not substantially deform, the pivot point 152 of the hanger 150 may pivot within the pivot point receiver 148 of the base body 142; and the deformable upper bushing 164 and the deformable lower bushing 166 may compress their shape on the side of the hanger 150 closer to the wheel beneath the second side 116 of the deck 110.

Third, FIG. 4C shows a side view of the toy finger skateboard assembly 100 with a cross section through the centers of the kingpin 158 and the column 144 of the base body 142 (i.e., along a center of the width of deck 110). In the illustrated embodiment, the flange 143 of the base body 142 is disposed within the flange receiver 118 of the deck 110, and the column 144 of the base body 142 is disposed within the throat 124 of the through hole 120 of the deck 110. As is shown in FIG. 2 and FIG. 5C, in at least some embodiments, the flange 143 includes a substantially vertically extending portion; and the flange 143 further includes a substantially horizontally extending portion attached to a top or distal end side of the substantially vertically extending portion. In these embodiments, the flange receiver 118 may include a through hole that further includes a stepped portion. A top surface of the stepped portion of the through hole of the flange receiver 118 is configured to be in contact with a bottom surface of the substantially horizontally extending portion of the flange 143. The remaining components shown in FIG. 4C are consistent with the above-noted description, and discussion of the same is omitted.

Figure 4D:
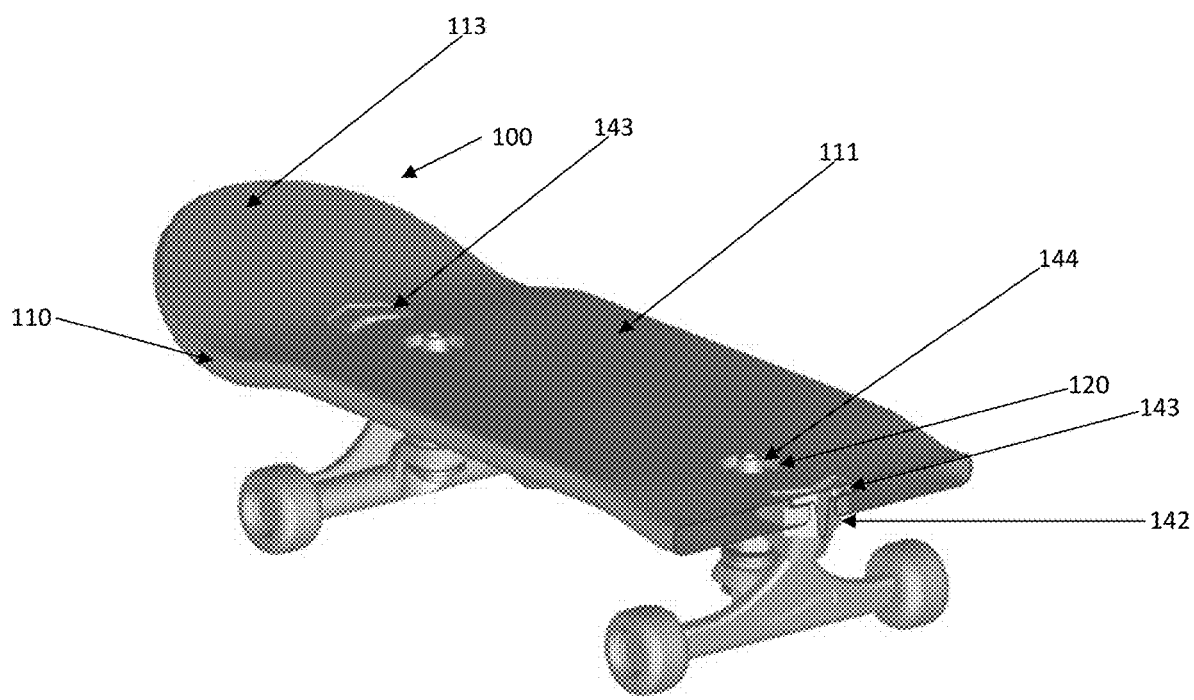
FIG. 4D shows an isometric perspective, cross-sectional view with a cross section through a flange of the base body of the truck assembly, in accordance with aspects of the present application.

FIG. 4D shows an isometric view of the toy finger skateboard assembly 100 with a cross section through the flange 143 of the base body 142 of the truck assembly 140 that is closer to the second end 114 (not shown in FIG. 4D), which is opposite to the first end 113 of the deck 110. In this embodiment, the columns 144 of the base bodies 142, which are in their original state S1, protrude above the top surface 111 of the deck 110 because the height of the column 144 is greater than the height of the through hole 120 of the deck 110.

Figure 5A:
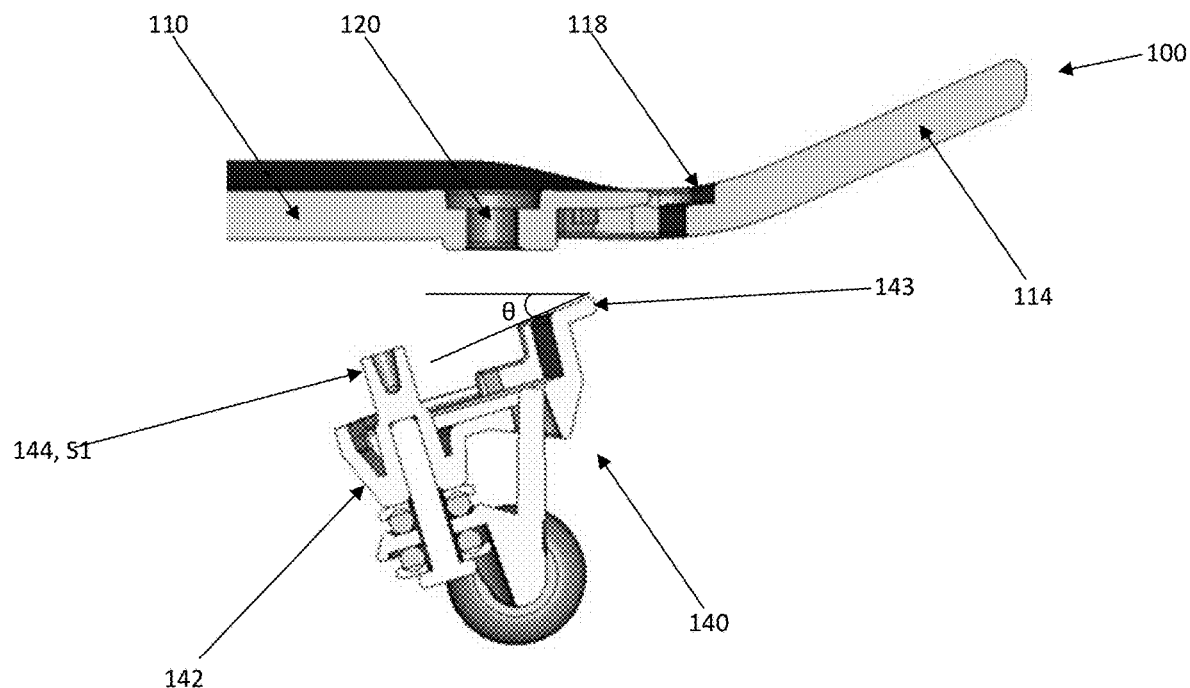
FIGS. 5A through 5F show progressive positions of the truck assembly and a deck during an exemplary method of attaching the truck assembly to the deck of the toy finger skateboard assembly, in accordance with aspects of the present application.
Figure 5B:
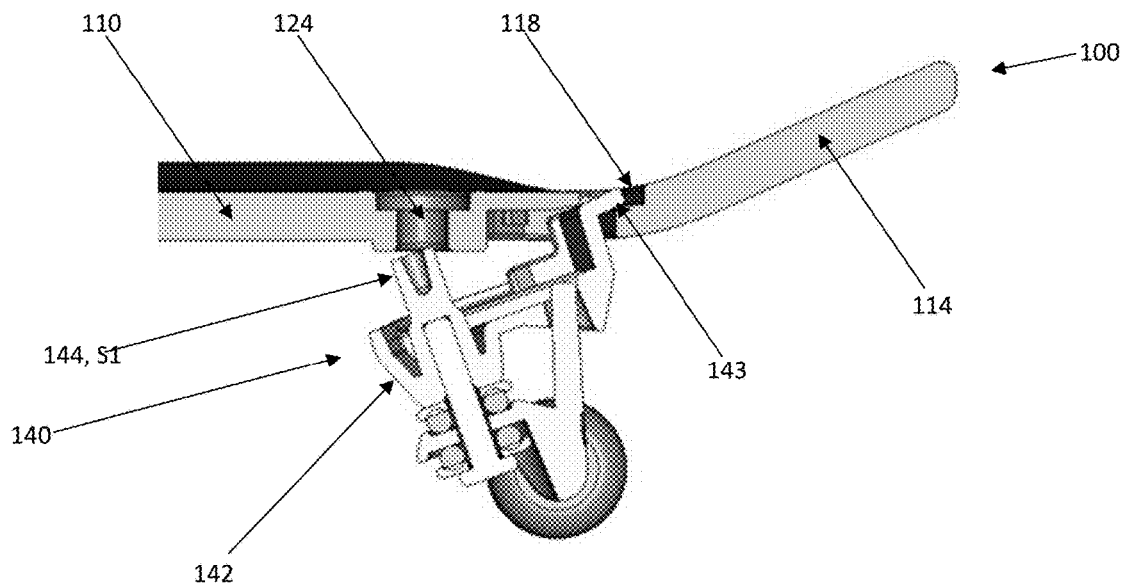
Figure 5C:
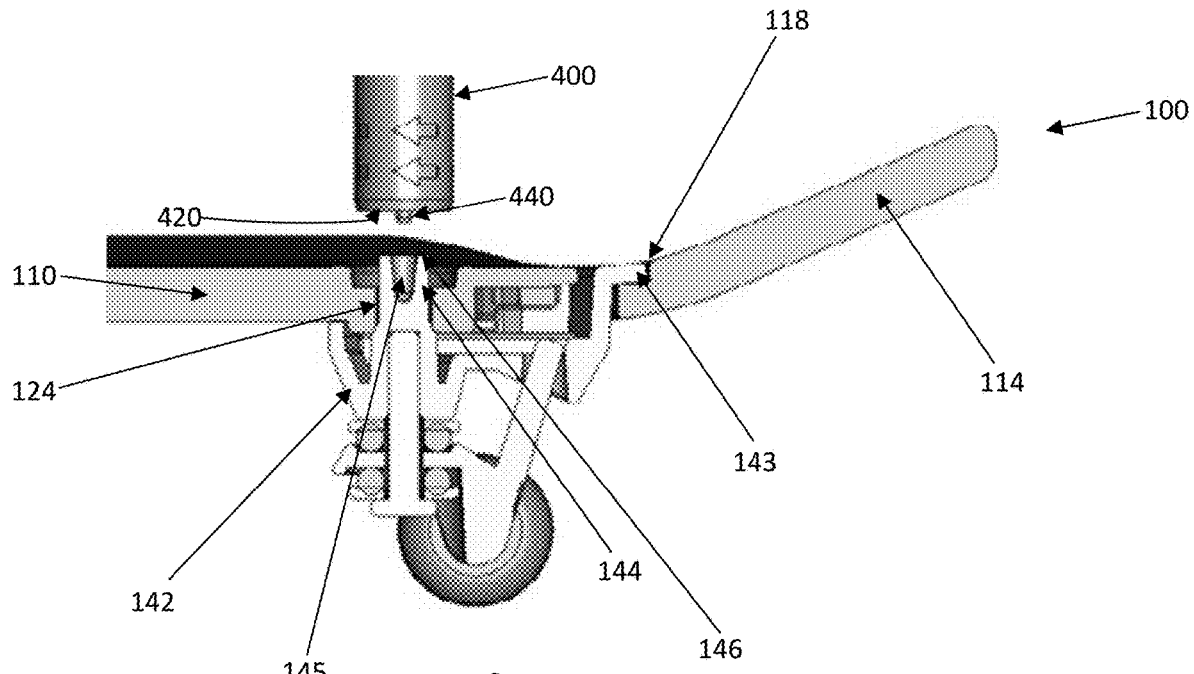

FIGS. 5A-5F show, sequential cross-sectional side views of the truck assembly 140 being attached to the deck 110. In particular, FIG. 5A shows the truck assembly 140 initially detached from the deck HO. Then, from FIG. 5A to FIG. 5B, the truck assembly 140 is brought into contact with the deck 110. First, as is shown in FIGS. 5A and 5B, the flange 143 of the base body 142 is partially inserted into the flange receiver 118 of the deck 110. In one embodiment, the truck assembly 140 is tilted to a predetermined angle θ, then lifted upward and toward the distal end of the deck 110 (in this embodiment, toward the second end 114 of the deck 110) such that the flange 143 is inserted into the flange receiver 118 of the deck 110.

FIG. 5B shows the flange 143 of the base body 142 partially inserted into the flange receiver 118 of the deck, Between FIG. 5B and FIG. 5C, the base body 142 is rotated (in the embodiment shown, in a clockwise direction about an axis extending horizontally in a direction parallel to the width of the deck 110) such that the column 144 is inserted into the through hole 120 of the deck 110. The column 144 is particularly configured to be inserted into and through the throat 124 of the through hole 120 of the deck 110. The column 144 shown in FIG. 5A through FIG. 5C is the column 144 in its original state S1.

FIG. 5C shows the column 144 having been rotated and inserted into the throat 124 of the through hole 120 of the deck 110. FIG. 5C further shows a welder 400 in a first position. The welder 400 may be, e.g., any welder capable of softening and deforming a material of the column 144, such as a friction stir spot welding machine, a spin welding machine, etc., and may include a pin 440, which may have a shape corresponding to the bottom surface of the cavity 145 of the column 144. In one embodiment, the welder 400 is a spin welder, which generates heat by rotational friction to deform the column 144. In this regard, the welder 400 may execute rotational motion to heat and deform the column 144, which may consist of theromoplastic material. In an alternative embodiment, if predetermined portions of the deck 110 and truck assembly 140 are composed of metal, the top end 146 of the truck assembly 140 may be affixed to the seat 122 of the deck 110 via welding, e.g., gas metal arc welding, gas tungsten arc welding, shielded metal arc welding, and/or flux-cored arc welding. Further, the welder 400 may affix the column 144 to the deck 110 via any method of attaching components now known or later developed. Accordingly, the welder 400 does not necessarily rotate.

Figure 5D:
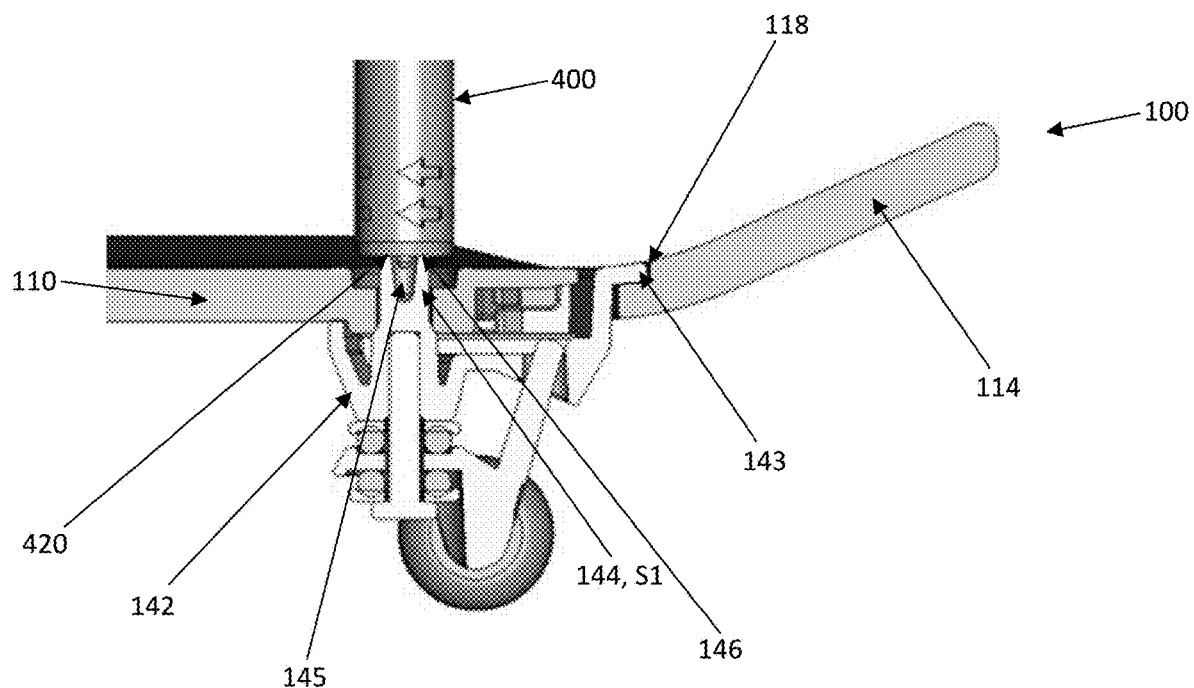

In the embodiment shown, between FIG. 5C and FIG. 5D, the welder 400 and the toy finger skateboard assembly 100 are moved relative to one another such that a bottom surface 420 of the welder 400 comes into contact with a top end 146 of the column 144. In one embodiment, in addition to being configured for rotational motion, the welder 400 is configured to move up and down. In an alternative embodiment, the welder 400 performs rotational motion in a fixed vertical position, and a grip or platform on which the toy finger skateboard assembly 100 is affixed moves up and down such that the toy finger skateboard assembly 100 is brought toward and away from the welder 400. In yet another embodiment, both the welder 400 and the toy finger skateboard assembly 100 are configured to may move vertically/longitudinally. For simplicity, the toy finger skateboard assembly 100 in FIG. 5C through FIG. 5F remains in a fixed spatial position, and the welder 400 moves vertically relative to the toy finger skateboard assembly 100. Thus, from FIG. 5C to FIG. 5E, the welder 400 spins and moves downward; and from FIG. 5E to FIG. 5F, the welder 400 moves upward (with or without spinning).

FIG. 5D shows the welder 400 in a second position in which the bottom surface 420 of the welder 400 is in contact with the top end 146 of the column 144. In the illustrated embodiment, the welder 400 is a spin welder in the process of rotating, and the truck assembly 140 is generally held in a fixed position such that the truck assembly 140 does not execute rotational motion as a result of its contact with the welder 400. When the bottom surface 420 of the welder 400 contacts the top end 146 of the column 144, (1) heat is generated by the rotational friction therebetween and (2) the pin 440 of the welder 400 is moved toward bottom surface of the cavity 145 of the column 144, i.e., the welder 400 is moved downward such that the column 144 is deformed via spin welding. From FIG. 5D to FIG. 5E, the column 144 is deformed from the original state S1 to the deformed state S2.

Figure 5E:
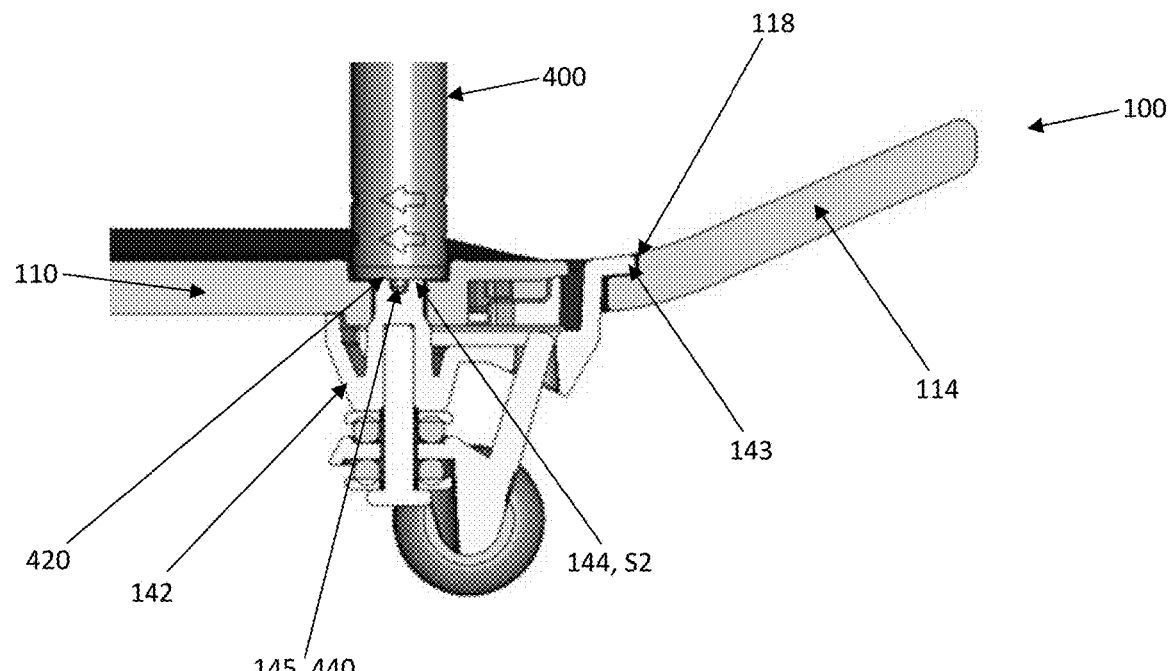

FIG. 5E shows the welder 400 in a third position in which the nose 440 of the welder 400 has been moved to (or substantially adjacent to) the bottom surface of the cavity 145 of the column 144. In this embodiment, the welder 400 will have moved to its lowest position such that the column 144 has been deformed to the deformed state S2 via spin welding of the welder 400. As noted above, from FIG. 5E to FIG. 5F in the embodiment shown, the welder 400 lifts upward away from the deck 110.

Figure 5F:
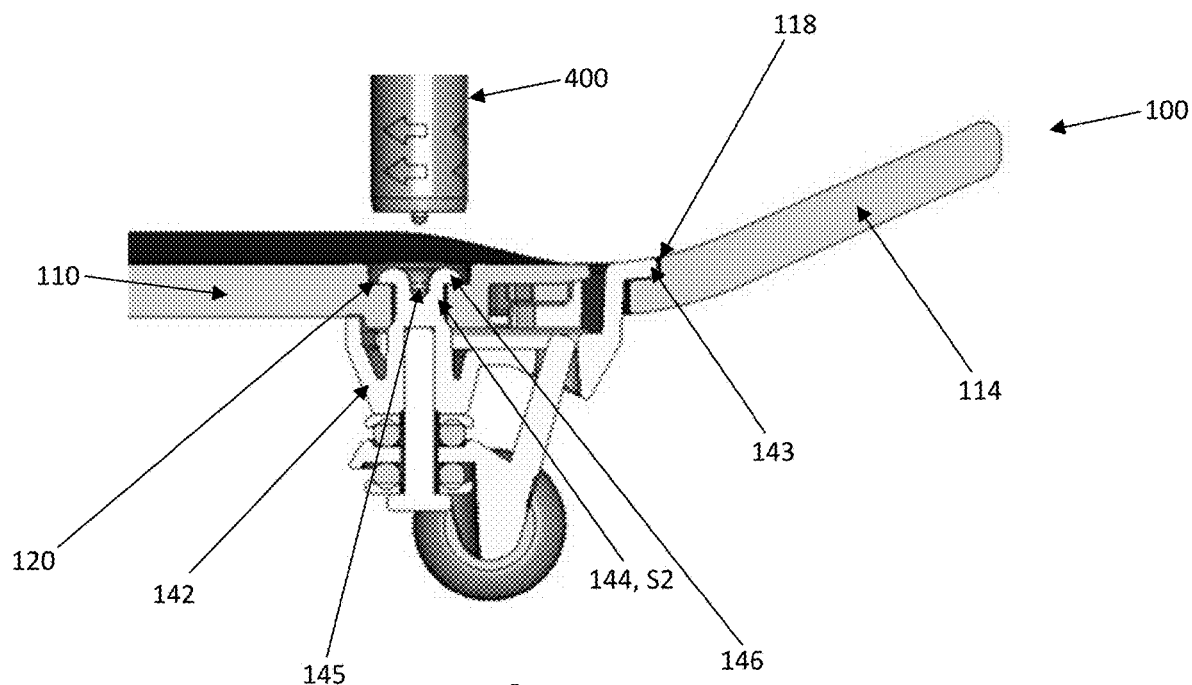
Figure 6:
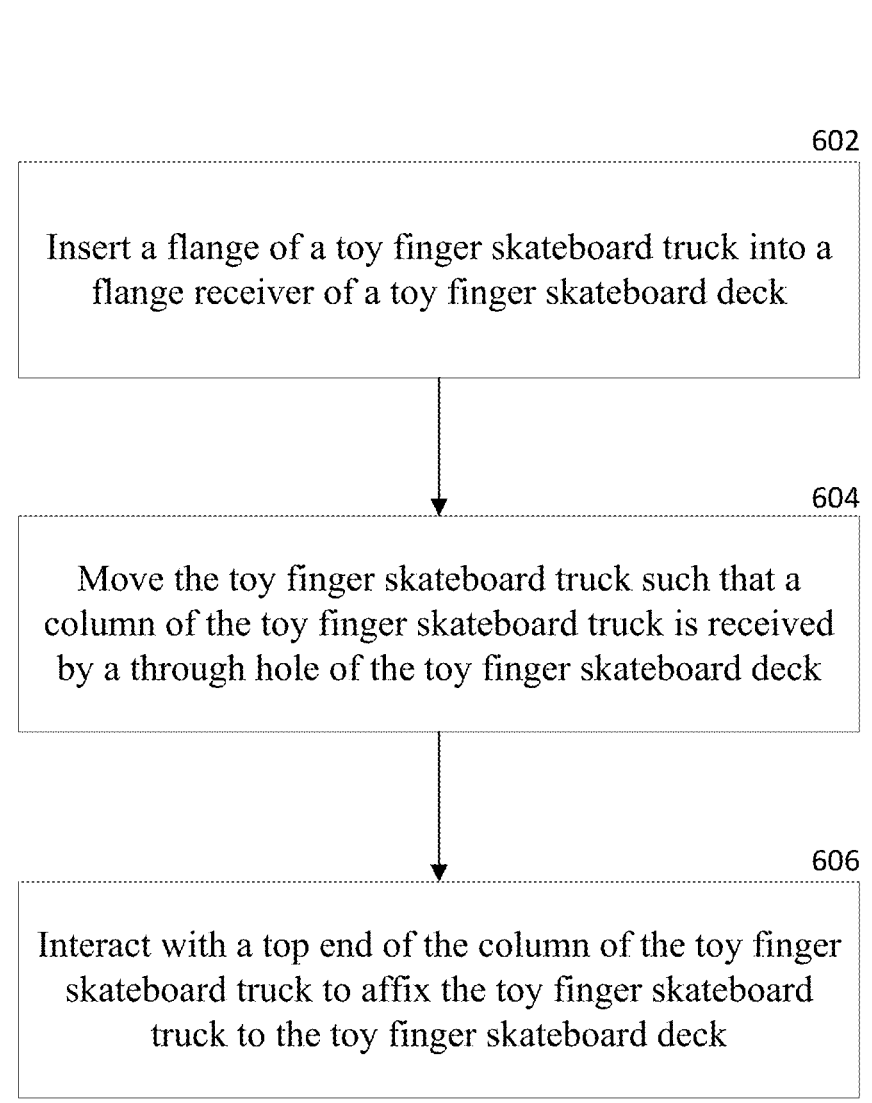
FIG. 6 is a flowchart of an exemplary method of attaching the truck assembly to the deck of the toy finger skateboard assembly, in accordance with aspects of the present application.

FIG. 5F shows the welder 400 in a fourth position in which the welder 400 is no longer in contact with the column 144 of the base body 142. In FIG. 5F, the truck assembly 140 has been attached to the deck 110. Specifically, the column 144 has been deformed to the deformed state S2 such that the top end 146 of the column 144 has been deformed to contact the seat 122 of the through hole 120 of the deck 110, i.e., the column 144 is deformed into a seat flange. In this regard, the combination of the flange 143 and the deformed column 144 in the form of a seat flange prevent the truck assembly from moving in any direction, i.e forward, backward, left, right, upward, and downward, relative to the deck 110. That is, this combination of couplings eliminates all degrees of freedom between the main body 142 of a truck assembly 140 and the deck 110. While this process of attaching the truck assembly 140 to the deck 110 is illustrated with respect to the truck assembly 140 closer to the second end 114, the same process may be repeated with the other truck assembly 140 closer to the first end 113. In the alternative, there may be two welders 400 that simultaneously perform the above-noted welding process on the truck assemblies associated with the first side 115 and the second side 116.

The above-noted method of attaching the truck assembly 140 to the deck 110 is advantageous in that such method obviates the need for separate components (e.g., screws, nuts, and other such components) to attach the truck assembly 140 to the deck 110. Because these additional components are no longer necessary, the manufacturing process is more efficient and can lead to decreased manufacturing costs. Further, because these additional components. e.g., nuts, bolts, etc., are necessarily small and thus easy to lose, the end user or customer of the toy finger skateboard is not susceptible to losing such small components, therefore ultimately increasing user satisfaction.

In the embodiment shown in FIG. 5F, the column 144 is deformed such that the column 144 in the deformed state S2 no longer protrudes above the top surface 111 of the deck 110, Accordingly, the grip layer 130 may be attached to the top surface 111 of the deck 110 to cover the through hole 120, the flange 143, and the flange receiver 118. The result is an aesthetically pleasing appearance and a functional grip layer 130 on which the user can place his or her toy finger shoes 200, which are discussed in further detail below with respect to FIGS. 7-9, FIG. 6 is a flowchart of a method 600 of manufacturing a toy finger skateboard, in accordance with aspects of the present application. The method 600 begins at step 602. At step 602, a flange portion of a toy finger skateboard truck is inserted into a flange receiver of a toy finger skateboard deck. At step 604, the toy finger skateboard truck is moved such that a column portion of the toy finger skateboard truck is received by a through hole of the toy finger skateboard deck. At step 606, there is interaction with a top end of the column portion of the toy finger skateboard truck such that the toy finger skateboard truck is affixed or attached to the toy finger skateboard deck. This interaction may be welding the top end of the column portion of the toy finger skateboard truck to a seat portion of the toy finger skateboard deck. At least a portion of the top end of the column portion, in some embodiments, is cylindrical. However, the column portion may be any suitable shape. The interaction may be, deforming the top end of the column portion to create a seat flange and/or the welding may be spin welding. Still further, the seat portion of the toy finger skateboard deck may be below a top surface of the toy finger skateboard, a grip layer may be affixed to the top surface of the deck, and the grip layer may cover the seat portion of the deck. As noted above, a user may play with the toy finger skateboard assembly 100 in combination with one or more toy finger shoes 200. A user, however, may play with the toy finger skateboard assembly 100 without any toy finger shoes 200, e.g., using his or her fingers alone.

Figure 7A:
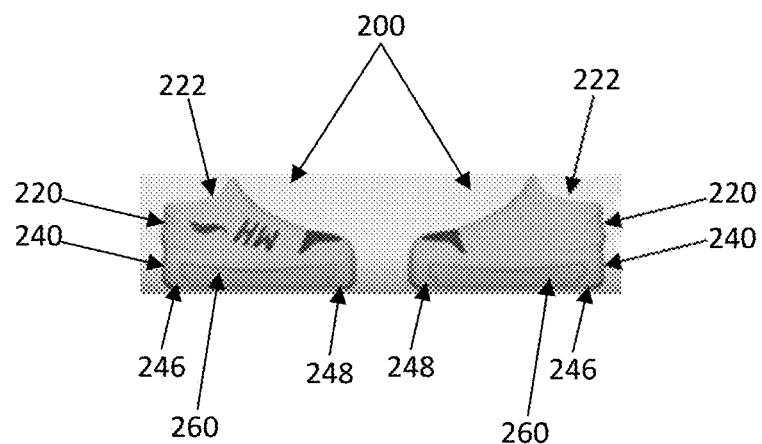
FIG. 7A shows opposing side perspective views of a toy finger shoe with an insert inserted into the toy finger shoe in accordance with aspects of the present application.
Figure 7B:
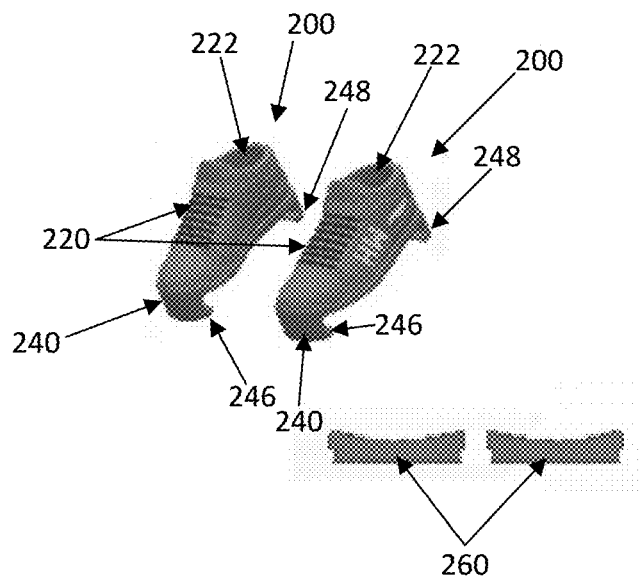
FIG. 7B shows an isometric perspective views of two toy finger shoes, which have had their associated inserts removed, and further shows a side perspective view of the inserts, which have been separated from the associated shoes in which they are configured to be inserted, in accordance with aspects of the present application.

Turning now to FIG. 7A through 7B, a toy finger skateboard shoe 200 is shown. In particular, a side view from a first side (showing an "outside" of the shoe) is shown on the left, and a side view from a second side (showing an "inside" of the shoe) is shown on the right. As shown in FIG. 7A, the shoe(s) 200 may generally include an upper 220, a sole 240, and an insert 260. The upper 220 may further include a finger hole 222, which is configured to accept a finger of an end user or customer. The sole 240 may further include a first bracket 246 and a second bracket 248, which are described in further detail below.

FIG. 7B is an isometric view of a pair of toy finger shoes 200 with their respective inserts 260 removed from the toy finger shoes 200. Further, the removed inserts 260 are shown in side views. The toy finger shoes 200 may be used with the toy finger skateboard assembly 100 with the inserts 260 inserted into the shoes 200 or with the inserts 260 removed in one embodiment, the shoes 200 are configured such that when the inserts 260 are removed, the shoes 200 are attachable and detachable from the toy finger skateboard assembly 100. As shown in FIGS. 7A and 7B, the shape of the inserts 260 correspond to the shape of the first bracket 246 and second bracket 248. Further, the shape of the bottom surfaces of the soles 240 and the top surfaces of the inserts 260 further correspond to a shape of the deck 110 of the toy finger skateboard assembly 100, to which the shoes 200 are configured to attach. Specifically, in the embodiment shown in FIGS. 7A and 7B, the bottom surface of the sole 240 in each shoe 200 between the first bracket 246 and the second bracket 248 is convex, which corresponds with the concave curve between the first side 115 and second side 116 of the deck 110.

When the insert 260 is inserted into the sole 240 of the shoe 200, the user may still wear the toy finger shoe 200 on the user's fingertip. Further, when the insert. 260 is inserted into the sole 240 of the shoe 200, the bottom surface of the shoe is substantially continuous between the first bracket 246 and the second bracket 248. This continuous bottom surface of the sole 240, which has the insert 260 inserted, is not necessarily limited to any shape and may be flat, planar, or convex. In other words, when the insert 260 is inserted into the sole 240 of the shoe 200, there is not a substantial gap extending from the bottom surface of the first bracket 246 to the bottom surface of the second bracket 248. In this regard, while shoes 200 are detached from the toy finger skateboard assembly 100 and the inserts 260 are inserted into the soles 240 of the shoes 200, the user may still be able to "walk" on a surface with the shoes 200 or perform ground tricks with the toy finger skateboard assembly 100 with the shoes 200 attached to his or her fingertips 320. Since the toy finger skateboard kit enables a user to use the shoes both while attached and detached from the toy finger skateboard assembly 100, the toy finger skateboard kit offers enhanced versatility and thus provides for a more diverse user experience than traditional toy finger skateboards.

Figure 8:
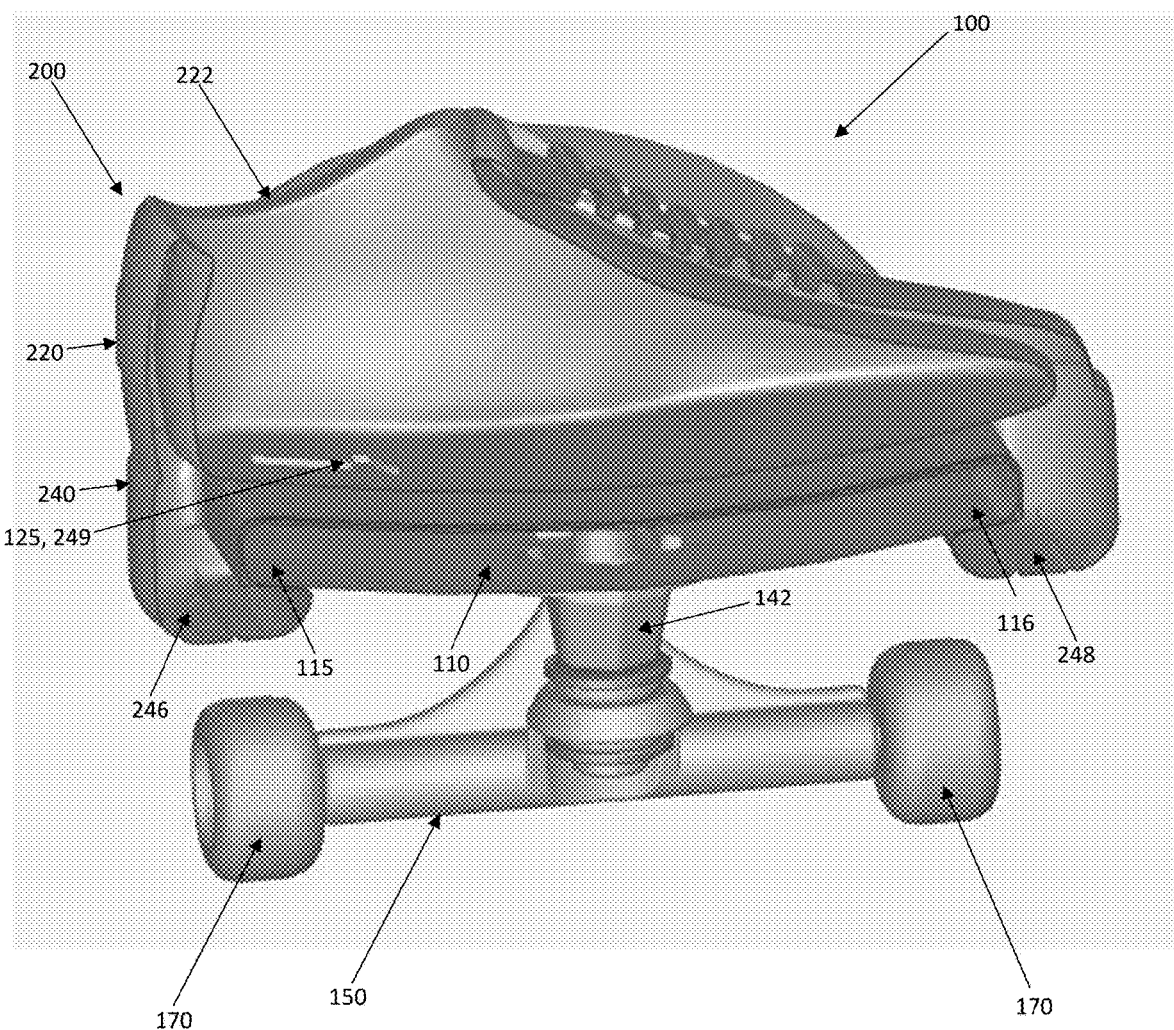
FIG. 8 shows a front perspective, cross-sectional view of a toy finger shoe attached to a toy finger skateboard assembly, which has a cross section through a flange portion of the base body portion of the skateboard truck within the board assembly in accordance with aspects of the present application.

FIG. 8 shows a substantially front perspective view of a shoe 200 attached to a toy finger skateboard assembly 100 with a cross section through the center of the shoe 200 placed on the toy finger skateboard assembly 100 on a distal end side of one truck assembly 140. As shown, the width of the shoe 200 is wider than the width of the deck 110. Further, the sole 240 of the shoe 200 includes the first bracket 246 and the second bracket 248, both of which generally include a vertical portion that is configured to contact a side edge of the deck 110 to which the shoe 200 is attached. On lower end sides of the vertical portions of the first bracket 246 and the second bracket 248, the first bracket 246 and the second bracket 248 further include horizontal portions that are configured to contact a portion of the bottom surface 112 of the deck 110. The first bracket 246 and the second bracket 248 may have reflectional symmetry about a plane that vertically divides the toy finger skateboard deck 110 along its longitudinal center.

As shown in FIG. 8, the toy finger skateboard deck 110 may have a slight concave curve between the first side 115 and the second side 116, and the bottom surface of the sole 240 between the first bracket 246 and the second bracket 248 may have a slight convex curve corresponding to the lateral concave curve of the toy finger skateboard deck 110. FIG. 8 further illustrates the toy finger skateboard deck 110 may have a shoe bracket 125 located on and protruding above the top surface 111 of the deck 110 and/or the top surface 132 of the grip layer 130. The bottom surface of the sole 240 between the first bracket 246 and the second bracket 248 may further include a bracket receiver 249, which is a recessed portion configured to accept the shoe bracket 125. When the bracket receiver 249 of the shoe 200 accepts the shoe bracket 125, which is attached to the deck 110, the shoe is generally prevented from moving laterally, i.e., from moving toward or away from the first end 113 or the second end 114.

There may be at least two methods of attaching a shoe 200 to a toy finger skateboard assembly 100, In either method, however, the first step of attaching the shoe 200 to the toy finger skateboard assembly 100 is to remove the insert 260 of each shoe 200 from the shoe 200. This may be accomplished by pressing laterally on a side of the insert 260 such that the insert 260 slides out of the first bracket 246 and the second bracket 248, According to a first method of attachment, the main body of the shoe 200, which includes the upper 220 and the sole 240, may consist of a deformable material such that the shoe 200 is configured to bend or deform and subsequently return to its original shape. The deformable material of the shoe 200 may be an elastic material that returns to its original shape after deformation, and the deformable material may be a resilient deformable material. Alternatively, the shoe 200 may comprise a rigid material.

Thus, the first bracket 246 of the shoe 200 may be placed on the first side 115 at a location such that the bracket receiver 249 is in a position to accept the shoe bracket 125. Subsequently, the shoe 200 may be wrapped around the top surface of the deck 110 such that the bottom surface of the sole 240 between the first bracket 246 and the second bracket 248 contacts the top surface 111 of the deck and/or the top surface 132 of the grip layer 130.

Finally, the second bracket 248 can be wrapped around the second side 116 of the deck 110. In one embodiment, the shoe 200 makes a snapping noise when the second bracket 248 is attached to the second side 116 of the deck 110. Either way, both the first bracket 246 and the second bracket 248 hug the sides of the deck 110. In the alternative, a user may begin by attaching the second bracket 248 to the second side 116 of the deck 110 and wrap the shoe around the deck and finish by wrapping the first bracket 246 around the first side 115 of the deck. Similarly, the shoe 200 may make a snapping noise when the first bracket 246 is attached to the first side 115 of the deck 110.

In either case, to remove the shoe 200, a user may apply pressure to the inside of the first bracket 246 such that the first bracket 246 is pushed away from the first side 115 of the deck 110. Alternatively, the shoe 200 may be removed by applying pressure to the inside of the second bracket 248 such that the second bracket 248 is pushed away from the second side 116 of the deck 110. Once the first bracket 246 or the second bracket 248 is removed from the respective side of the deck 110, the shoe may be released from the shoe 200.

According to a second method of attachment, the material of the shoes 200 is not limited to a deformable material, but may be a deformable or rigid material. In this second method of attaching the toy finger shoes 200 to the toy finger skateboard assembly 100, each shoe 200 may slide laterally onto the board from either the first end 113 or the second end 114 of the deck 110. To facilitate this movement, the shoe bracket 125 may be movable.

For example, the shoe bracket 125 may be attached to a spring (not shown) and a button or lever (not shown). When the button or lever is activated, the shoe bracket 125 may be pulled to a location beneath the surface of the deck 110; and when the button or level is released, the spring connected to the shoe bracket 125 may push the shoe bracket 125 to its original position protruding above the surface of the top surface 111 of the deck 110 or the top surface 132 of the grip layer 130. Thus, when the user is sliding a shoe 200 onto the deck 110, the user may activate the button or level to move the shoe bracket 125 out of the way of the sliding shoe 200, and when the shoe 200 is at a position where the bracket receiver 249 is above the recessed shoe bracket 125, the user may release the button or lever such that the bracket receiver 249 accepts the shoe bracket 125 as the shoe bracket 125 returns to its original position protruding above the top surface 111 of the deck 110. When a user desires to remove a shoe 200 from the toy finger skateboard assembly 100, the user may hold down the button or lever such that the shoe bracket 125 releases the shoe 200, and the shoe 200 may then be slid off the toy finger skateboard assembly 100.

After attaching a first shoe 200, the process of attaching the shoe 200 may be repeated with the other shoe 200 such that both shoes 200 are attached to the toy finger skateboard assembly 100. Regardless of the method of attachment, after both shoes 200 are attached to the finger skateboard assembly 100, the user may place his or her fingers in the finger holes 222 of the shoes 200 and perform tricks with the toy finger skateboard assembly 100. At least because of the attachment between the shoes 200 and the toy finger skateboard assembly 100, the tricks may include tricks that the user would not otherwise be able to perform.

For example, the toy finger skateboard assembly 100 with attached toy finger shoes 200 enables the user to perform, e.g., aerial tricks without the user needing to grabbing the toy finger skateboard with the user's thumb or fingers of the other hand. This enables a user to perform enhanced tricks while playing with the toy finger skateboard assembly 100 in a preferred manner, i.e., where the user only uses two fingers to imaginatively replicate the legs of a life-size skateboarder. Consequently, the toy finger skateboard kit according to the present application provides additional enhancements and play modes through the addition of removably attachable finger-tips shoes that selectively attach the toy finger skateboard. As noted above, however, the toy finger skateboard assembly 100 may be played with or used by the user without the shoes 200. Omitting the shoes 200 may be desirable, for example, to minimize the amount of components included in the toy finger skateboard kit.

While the shoe 200 may be slid or snapped onto the deck 110, the shoe 200 method or mechanism by which the shoe 200 attaches to the deck 100 is not limited to any particular method or mechanism and may use additional or alternative methods now known or later developed.

In one alternative embodiment, the deck 110 may include one or more holes or cavities (not shown) that are configured to accept one or more components, e.g., posts, that protrude downward from the bottom surface of the sole 240 of the shoe 200. These one or more protruding posts may be unitarily formed in sole 240 of the shoe 200 and configured to mate with the one or more corresponding cavities in the top surface 111 of the deck 110. The cavities may be located at one or more locations in the top surface 111 of the deck 110 where a toy finger shoe 200 would typically contact the deck 110. For example, the cavity or cavities may be located on the top surface 111 of the deck 110 at location(s) above the truck assembly 140. In another embodiment, the cavity or cavities may be on the deck 110 at positions inward from above the truck assembly with respect to the first end 113 and the second end 114 of the deck 110 such that the shoes 200, when attached, appear similar to the positioning of the shoes shown in FIG. 1. The location(s) of the cavity or cavities, however, is not limited and may be at any location(s) on the top surface 111 of the deck 110.

A configuration that includes posts in the shoes 200 and corresponding cavities in the deck 1110 may or may not include attachable/detachable insert(s) 260. In one embodiment, the shoes 200 do not have include the first bracket 246 or the second bracket 248, and the inserts 240 take a different shape than that shown in FIGS. 7A and 7B. In particular, the inserts 240 may have the same length and width of the sole 240, may have cavities, which are used to attach to inserts to the posts of the shoe 200. In another embodiment, there are no inserts 240 and the bottom surface of the soles 240 include the protruding posts.

While there may be one cavity and one corresponding post per shoe 200, the number of cavities and number of corresponding posts per shoe is not necessarily limited. For example, two posts on the bottom of each shoe 200 may mate with two corresponding cavities on either side of the deck 110. Alternatively, there may be any number of cavities and corresponding posts on each shoe 200. Further, the number of cavities on each side of the deck 110 may not be equal to the number of posts on each shoe. For example, each shoe 200 may include only one post, but there may be a plurality of cavities on each side of the deck 110 such that the user may position the shoe 200 in varying positions or locations on the top surface 111 of the deck 110 by mating the post of the shoe 200 with one of the plurality of cavities on the top surface 111 of the deck 110. Therdore, there may any number of cavities in the deck 110 and any number of posts on the bottom surface of the shoe(s) 200.

In yet another embodiment, the deck 110 may have posts that mate with cavities within the shoes 200. Specifically, the deck 110 may include one or more components, e.g., post(s) (not shown), that protrude from the top surface 111 of the deck 110. The one or more posts on the deck 110 may be configured to mate with one or more corresponding cavities (not shown) in the bottom surface of the sole 240 of the shoe 200. The post(s) may protrude from the top surface 111 of the deck 110 at one or more locations where the toy finger shoes) 200 would typically contact the toy finger skateboard. For example, the post(s) may protrude from the top surface 111 of the deck 110 at location(s) above the truck assemblies 140. In another embodiment, the posts may be on the deck 110 at positions inward from above truck assemblies 140 with respect to the first end 113 and the second end 114 of the deck 110. The location(s) of the post(s) on the deck 110, however, are not limited and may be at any location(s) on the top surface 111 of the deck 110.

A configuration that includes post(s) on the deck 110 and corresponding hole(s) in the sole(s) 240 of the shoe(s) 200 may or may not include attachable/detachable insert(s) 260. The sole(s) 240 of the shoe(s) 200 may be unitarily formed.

While there may only be one cavity in each shoe 200 that corresponds to a corresponding cavity in the deck 110, the number of posts and number of corresponding cavities per shoe is not necessarily limited. For example, two posts on each side of the deck 110 may mate with two corresponding cavities in each shoe 200. Alternatively, there may be any number of posts and corresponding cavities in each shoe 200. Further, the number of posts on each side of the deck 110 may not be equal to the number of cavities in each shoe. For example, the deck 110 may include only one post corresponding to one shoe 200, and each shoe 200 may include a plurality of cavities in the sole 240 such that the user may position the shoe 200 in varying positions or locations on the top surface 111 of the deck 110 by mating the post with one of the plurality of cavities in the bottom surface of the sole 240 of the shoe 200. Therefore, there may any number of posts and any number of cavities in each sole 240.

While the posts and corresponding cavities may be cylindrical, the shape of a post and a corresponding cavity is not limited and may take any suitable shape.

In yet another embodiment, the shoes 200 may attach to the deck 110 in a manner similar to the manner in which a truck assembly 140 may attach to the deck 110. Specifically, each shoe 200 may have one or more flange portions (not shown), which are configured to be accepted by cavities, e.g., flange receiving portions, in the top surface 111 of the deck 110. In one embodiment, the deck 110 may have two different types of flange receiving portions; a first type of flange receiving portion may receive the flange 143 of the truck main body 142 in the manner described above, and a second type of flange receiving portion may receive a flange of a shoe 200.

The flange of the shoe 200 may be on a front portion and/or a back portion of the bottom surface of the shoe 200. After the second type of flange receiving portion in the deck 110 accepts the flange of the shoe 200, the shoe 200 may further connect to the deck 110 via a post and cavity method, similar to that described above; and the post or cavity may be located on the bottom surface of the shoe 200 on a side of the shoe 200 opposite to the flange. In another embodiment, after the second type of flange receiving portion in the deck 110 accepts the flange of the shoe 200, the shoe 200 may further connect to the deck 110 via a bracket located on a side of the shoe 200 opposite to the flange. In one embodiment, the flange is located on a front portion of the shoe 200, and a bracket is located on a back portion of the shoe resembles the second flange 248 shown in FIGS. 7A and 7B. In another embodiment; the flange is located on the back portion of the shoe 200, and the bracket is located on the front portion of the shoe and resembles the first flange 246 shown in FIGS. 7A and 7B.

In still yet another embodiment, attached to the board assembly 100, there may be bindings (not shown), which are configured to accept the shoes 100. In this embodiment, the bindings may resemble the bindings of a life-sized snowboard or wakeboard. Further, in this embodiment, the board assembly may not resemble a life-sized skateboard. Instead, the board assembly 100 may instead resemble a life-sized snowboard, and the "shoes" 100 may resemble life-sized snowboard boots. In a boots and binding embodiment which resembles that of a life-sized snowboard, the truck assemblies and wheels may be omitted. The bindings may be components separate from the deck 110. The bindings and the deck 110 may be configured such that they may be affixed to one another using the flange and welding method disclosed above with respect to the attachment of a truck assembly 140 and the deck 110, However, the bindings and the deck 110 may be attached an any other suitable manner now known or later developed. Further, the bindings may be unitarily formed with the deck 110.

Generally referring to FIGS. 1-8, the toy finger skateboard assembly 100 and/or shoes 200 may be fabricated from any suitable material, or combination of materials, such as metal, plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Additionally, it is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A toy finger board kit comprising:
a board; and
at least one shoe, each of which comprises:
a finger hole in an upper extending from a sole;
a first bracket extending from a front end of the sole, the first bracket configured to contact a first side edge of the board;
a second bracket attached to a back end of the sole, the second bracket configured to contact a second side edge of the board opposite the first side edge; and
an insert configured to be inserted in an opening defined between the first bracket and the second bracket when the first bracket and the second bracket is disconnected from the board.

2. The toy finger board kit of claim 1, wherein:
the at least one shoe has a length that is longer than a width of the board.

3. The toy finger board kit of claim 1, wherein:
the first bracket is further configured to wrap around the first side edge of the board, and
the second bracket is further configured to wrap around the second side edge of the board.

4. The toy finger board kit of claim 1, wherein:
the at least one shoe comprises a rigid material, and
the at least one shoe is configured to slide onto the board from a front end or a back end of the board.

5. The toy finger board kit of claim 1, wherein:
the at least one shoe comprises a deformable material, and
the at least one shoe is configured to attach to the board by placing the first bracket on the first side edge of the board and deforming the at least one shoe such that the second bracket wraps around the second side edge of the board.

6. The toy finger board kit of claim 1, wherein:
the board is a toy finger skateboard.

7. A shoe for a toy finger board comprising:
a finger hole in an upper of the shoe;
a bracket assembly comprising a first bracket extending from a first side of a sole of the shoe and a second bracket extending from a second side of the sole opposite the first side, the first bracket being configured to wrap around a first side edge of the toy finger board and the second bracket being configured to wrap around a second side edge of the toy finger board opposite the first side edge; and
an insert configured to be inserted in an opening defined between the first bracket and the second bracket when the bracket assembly is disconnected from the toy finger board,
wherein the bracket assembly is configured to:
removably attach the shoe to the toy finger board; and
receive the insert when the bracket assembly is removed from the toy finger board, wherein the insert provides a continuous bottom surface of the shoe when received in the bracket assembly.

8. The shoe of claim 7, wherein the first side of the sole is a front end of the sole and the second side of the sole is a back end of the sole.

9. The shoe of claim 7, wherein the shoe has a length that is longer than a width of the toy finger board.

10. The shoe of claim 7, wherein the bracket assembly comprises a rigid material and the shoe is configured to slide onto the toy finger board from a front end or a back end of the toy finger board.

11. The shoe of claim 7, wherein the bracket assembly comprises a deformable material, and the shoe is configured to attach to the toy finger board by deforming at least a portion of the bracket assembly.

* * * * *

UNITED STATES PATENT AND TRADEMARK OFFICE
CERTIFICATE OF CORRECTION

PATENT NO. : 11,554,327 B1
APPLICATION NO. : 17/582558
DATED : January 17, 2023
INVENTOR(S) : Tyler Kenney et al.

Page 1 of 1

It is certified that error appears in the above-identified patent and that said Letters Patent is hereby corrected as shown below:

In the Specification

Column 4, Line 50, change "ilia" to --alia--;
Column 6, Line 12, change "di stance" to --distance--;
Column 7, Line 55, change "view of the finger" to --view of the toy finger--;
Column 8, Line 29, change "none a these" to --none of these--;
Column 9, Line 47, change "HO" to --110--;
Column 14, Line 44, change ""attached to the finger" to --attached to the toy finger--;
Column 15, Line 27, change "1110" to --110--;
Column 15, Line 51, change "Therdore" to --Therefore--;
Column 15, Line 63, change "shoes)" to --shoe(s)--.

Signed and Sealed this
Twenty-second Day of August, 2023

Katherine Kelly Vidal
*Director of the United States Patent and Trademark Office*